(12) United States Patent
Majjigi et al.

(10) Patent No.: US 12,485,842 B2
(45) Date of Patent: Dec. 2, 2025

(54) CRASH DETECTION ON MOBILE DEVICE

(71) Applicant: Apple Inc., Cupertino, CA (US)

(72) Inventors: Vinay R. Majjigi, Mountain View, CA (US); Sriram Venkateswaran, Sunnyvale, CA (US); Aniket Aranake, San Jose, CA (US); Tejal Bhamre, Mountain View, CA (US); Alexandru Popovici, Santa Clara, CA (US); Parisa Dehleh Hossein Zadeh, San Jose, CA (US); Yann Jerome Julien Renard, San Carlos, CA (US); Yi Wen Liao, San Jose, CA (US); Stephen P. Jackson, San Francisco, CA (US); Rebecca L. Clarkson, San Francisco, CA (US); Henry Choi, Cupertino, CA (US); Paul D. Bryan, San Jose, CA (US); Mrinal Agarwal, San Jose, CA (US); Ethan Goolish, Mountain View, CA (US); Richard G. Liu, Sherman Oaks, CA (US); Omar Aziz, Santa Clara, CA (US); Alvaro J. Melendez Hasbun, San Francisco, CA (US); David Ojeda Avellaneda, San Francisco, CA (US); Sunny Kai Pang Chow, San Jose, CA (US); Pedro O. Varangot, San Francisco, CA (US); Tianye Sun, Sunnyvale, CA (US); Karthik Jayaraman Raghuram, Foster City, CA (US); Hung A. Pham, Oakland, CA (US); Lauren Schutz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 18/462,271

(22) Filed: Sep. 6, 2023

(65) Prior Publication Data

US 2024/0075895 A1    Mar. 7, 2024

Related U.S. Application Data

(60) Provisional application No. 63/436,453, filed on Dec. 30, 2022, provisional application No. 63/404,159, filed on Sep. 6, 2022.

(51) Int. Cl.
    *B60R 21/013*      (2006.01)
    *G06F 18/213*      (2023.01)
    *B60R 21/00*      (2006.01)

(52) U.S. Cl.
    CPC .......... *B60R 21/013* (2013.01); *G06F 18/213* (2023.01); *B60R 2021/0027* (2013.01); *B60R 2021/01302* (2013.01)

(58) Field of Classification Search
    CPC .......... B60R 21/013; B60R 2021/0027; B60R 2021/01302; G06F 18/213
(Continued)

(56) References Cited

U.S. PATENT DOCUMENTS 7,124,852 B2    10/2006    Hasegawa
9,449,495 B1*    9/2016    Call ..................... H04W 4/029
(Continued)

FOREIGN PATENT DOCUMENTS

CN      116605188 B    1/2024
DE      10-2009-033560 A1    9/2010
(Continued)

*Primary Examiner* — Kerri L McNally
(74) *Attorney, Agent, or Firm* — Fish & Richardson P.C.

(57) ABSTRACT

Embodiments are disclosed for crash detection on one or more mobile devices (e.g., smartwatch and/or smartphone). In some embodiments, a method comprises: detecting, with at least one processor, a crash event on a crash device; extracting, with the at least one processor, multimodal
(Continued)

features from sensor data generated by multiple sensing modalities of the crash device; computing, with the at least one processor, a plurality of crash decisions based on a plurality of machine learning models applied to the multimodal features; and determining, with the at least one processor, that a severe vehicle crash has occurred involving the crash device based on the plurality of crash decisions and a severity model.

18 Claims, 33 Drawing Sheets

(58) Field of Classification Search
USPC ...................................................... 340/425.5
See application file for complete search history.

(56) References Cited

U.S. PATENT DOCUMENTS

| | | | |
|---|---|---|---|
| 9,457,754 B1 * | 10/2016 | Christensen | G08G 1/205 |
| 9,767,625 B1 * | 9/2017 | Snyder | G07C 5/008 |
| 9,934,625 B1 * | 4/2018 | Wahba | G07C 5/008 |
| 10,728,378 B1 | 7/2020 | Waris et al. | |
| 10,900,993 B2 | 1/2021 | McGinty et al. | |
| 11,012,667 B1 * | 5/2021 | Nodder | H04N 7/181 |
| 11,069,162 B1 * | 7/2021 | Bellas | G07C 5/085 |
| 2021/0287512 A1 | 9/2021 | Kaindl | |
| 2022/0212618 A1 * | 7/2022 | Nie | B60R 21/0132 |
| 2023/0057497 A1 | 2/2023 | Schnee et al. | |
| 2023/0192220 A1 | 6/2023 | Na | |
| 2024/0329277 A1 | 10/2024 | Majjigi et al. | |

FOREIGN PATENT DOCUMENTS

| | | |
|---|---|---|
| DE | 10 2021 115 371 A1 | 12/2021 |
| DE | 10 2021 203 354 B4 | 11/2022 |
| DE | 10 2022 111 037 A1 | 2/2023 |
| DE | 10 2022 120 111 A1 | 3/2023 |
| DE | 10 2022 104 129 A1 | 8/2023 |
| IN | 202441001321 A | 2/2024 |
| KR | 10-2017-0011500 A | 2/2017 |
| KR | 10-2314816 B | 10/2021 |
| KR | 10-2022-0079777 A | 6/2022 |
| KR | 10-2538548 B1 | 5/2023 |
| KR | 10-2625231 B1 | 1/2024 |

* cited by examiner

400

| OBSERVED SIGNALS | SENSING MODE | | | |
|---|---|---|---|---|
| | IMU | GPS | PRESSURE | MIC |
| PRE-CRASH SIGNATURE | ✓ | ✓ | | |
| IMPACT SIZE | ✓ | | | |
| ROLL-OVER DETECTION | ✓ | | | ✓ |
| AIRBAG | | | ✓ | ✓ |
| CRASH SOUND | | | | ✓ |
| POST-CRASH SIGNATURE | ✓ | ✓ | | |

FIG. 4A

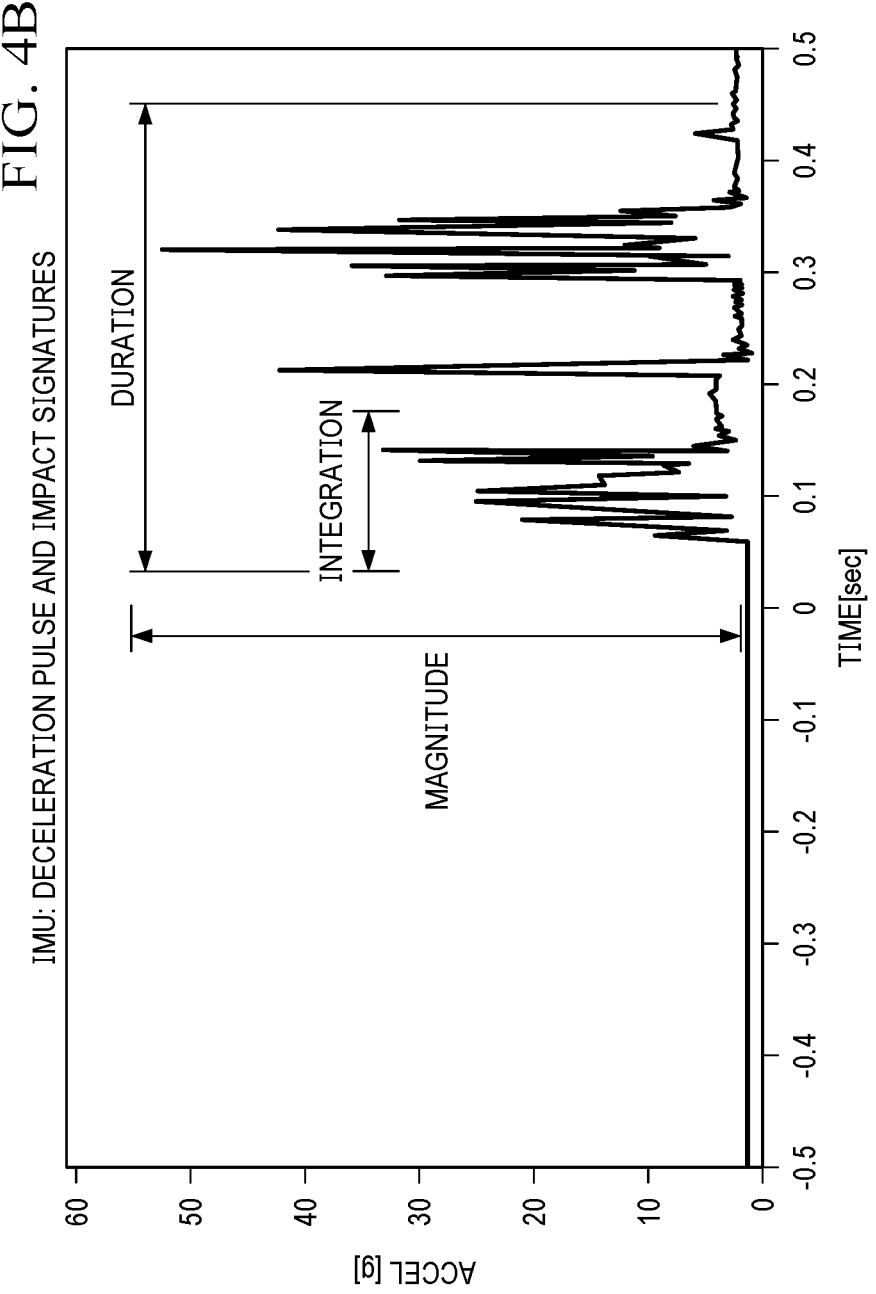

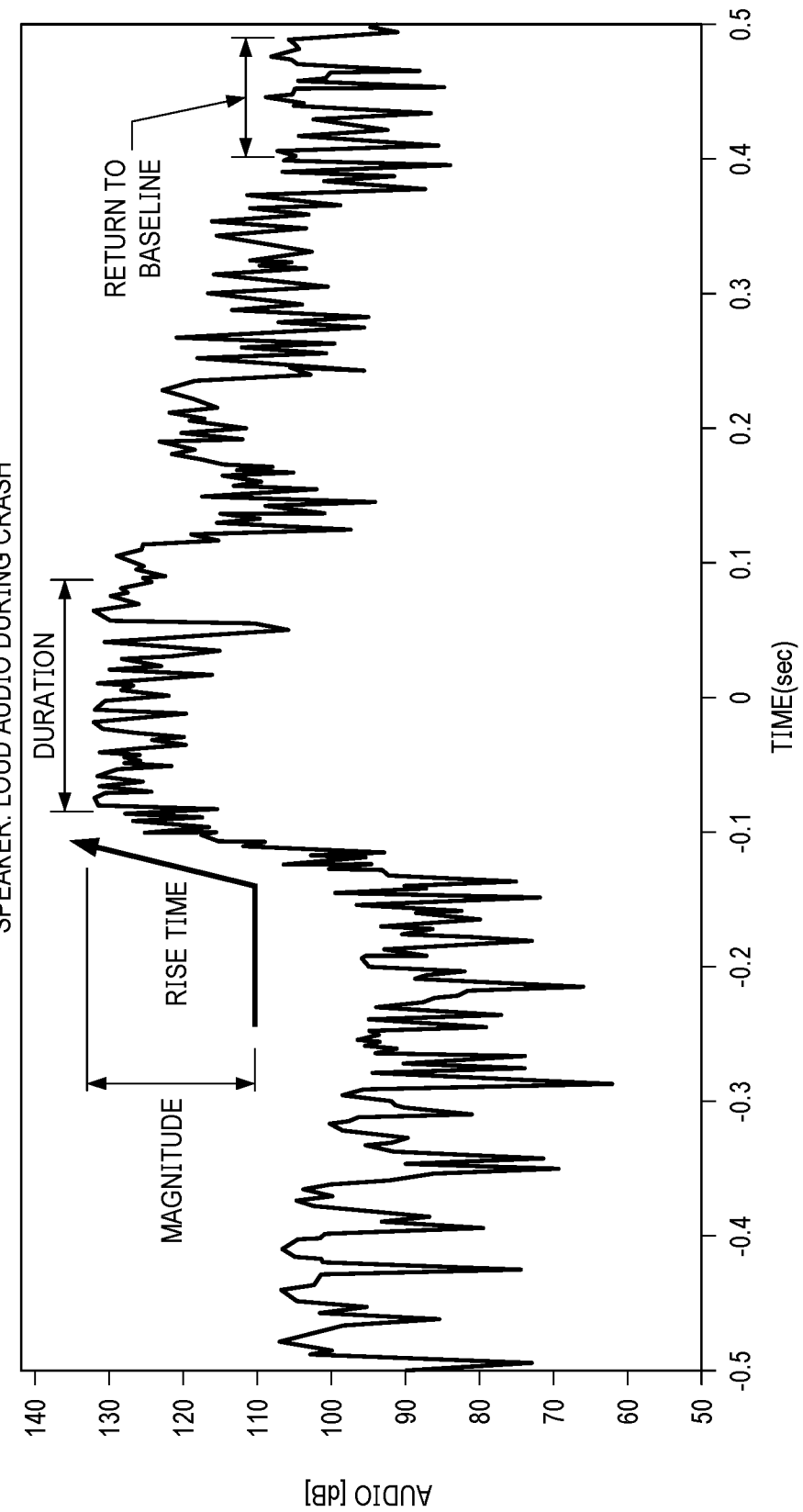

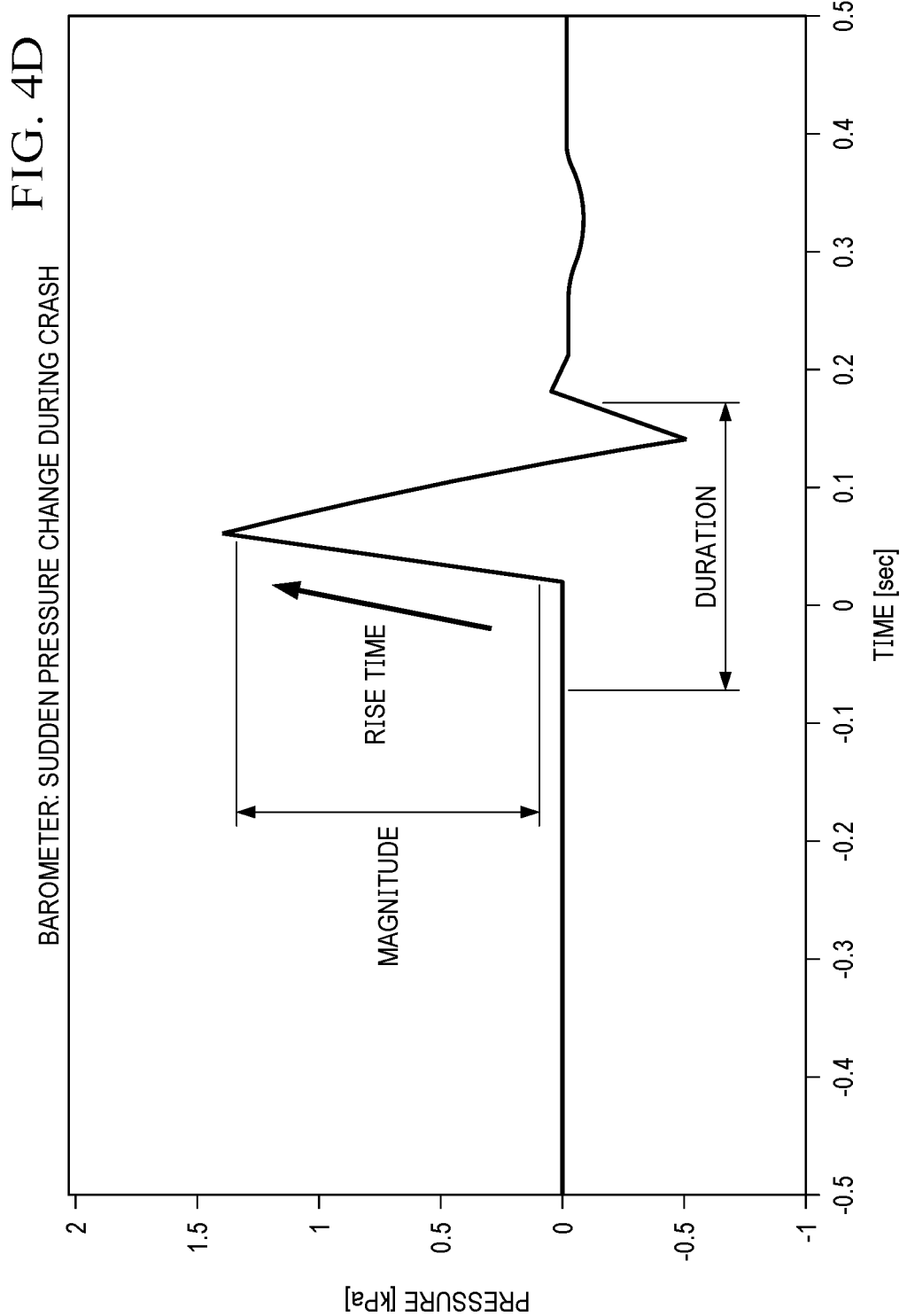

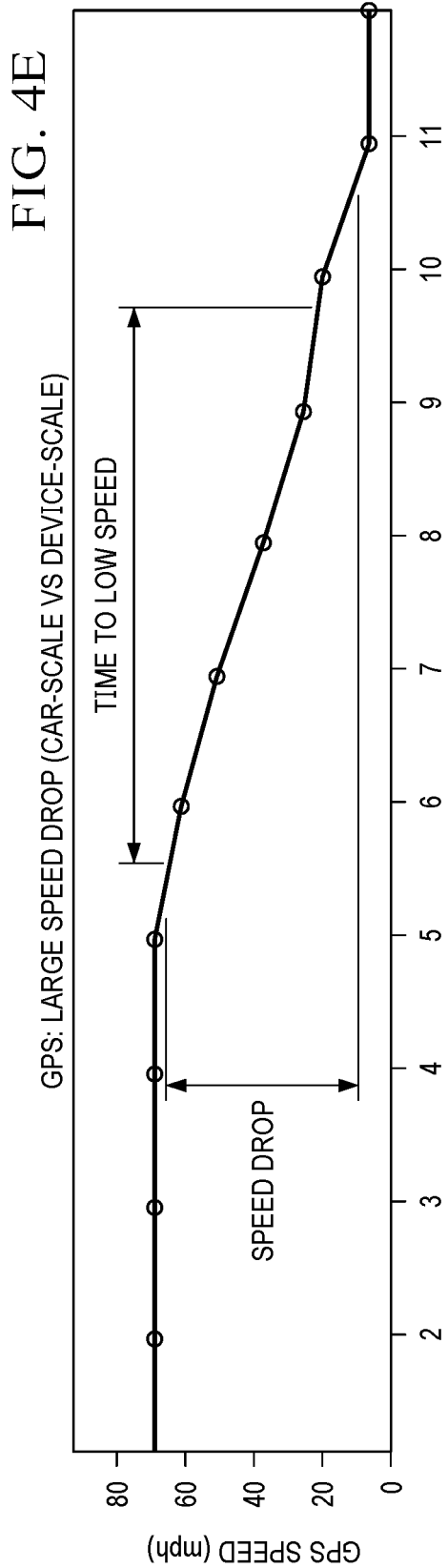

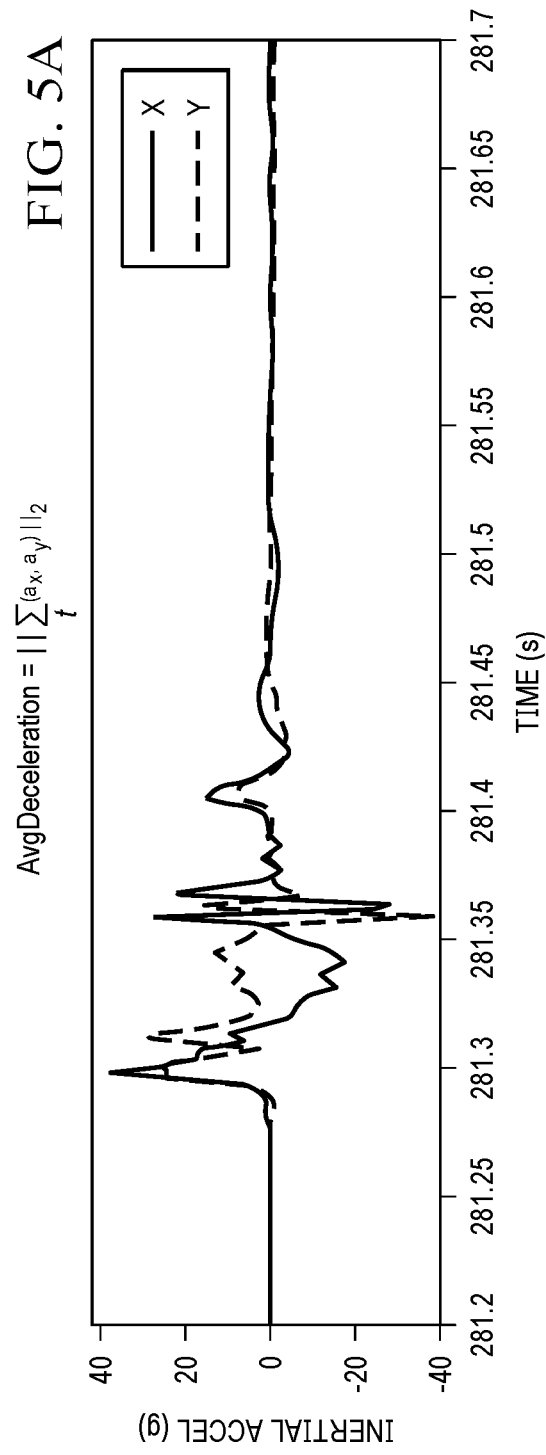
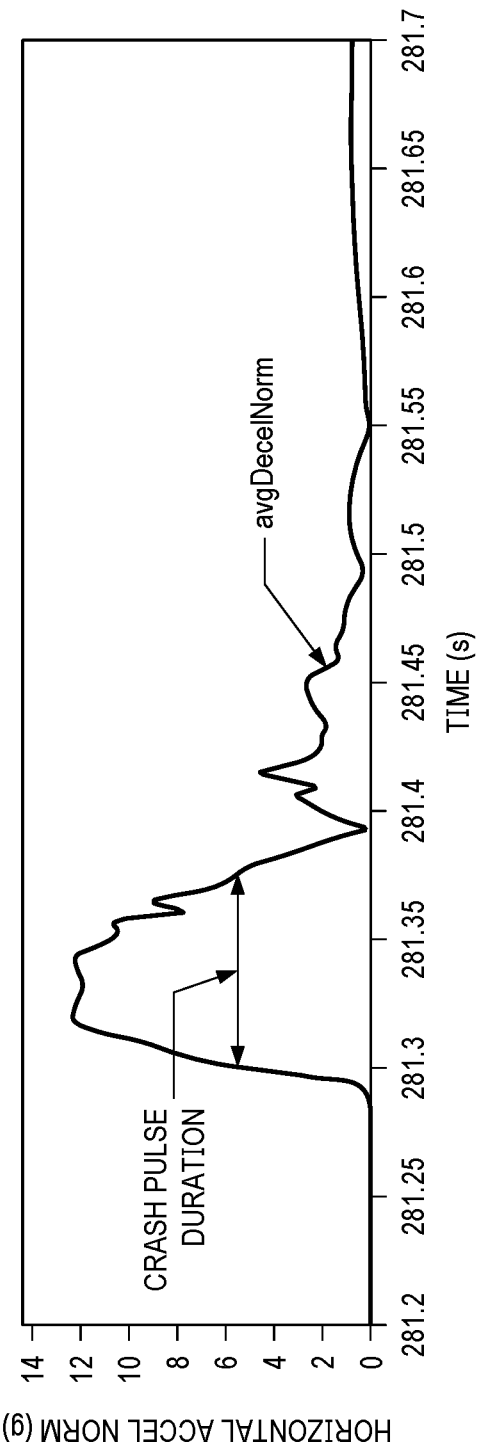

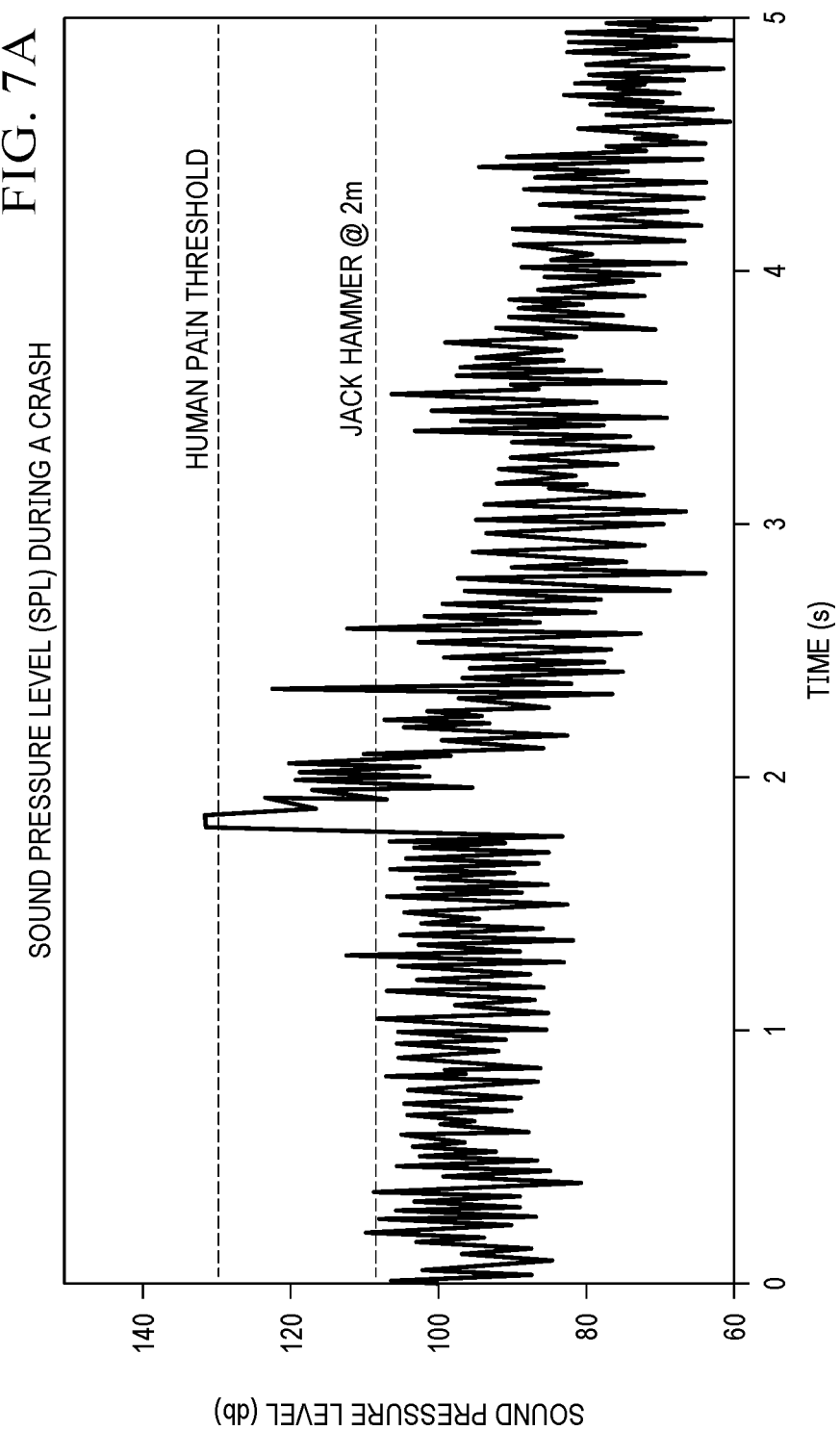

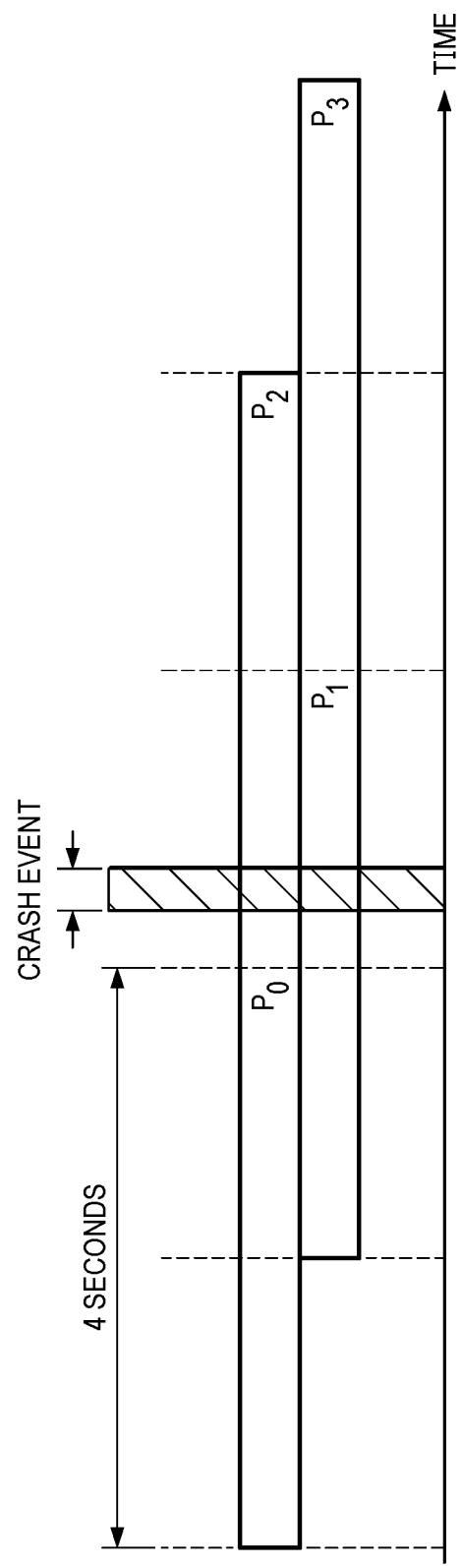

CRASH DETECTION ON MOBILE DEVICE

TECHNICAL FIELD

This disclosure relates generally to using a mobile device to detect when a user has been in a severe automobile accident.

BACKGROUND

When a driver or passenger is injured or otherwise incapacitated in a severe automobile accident, the driver or passenger may be unable to use their mobile phone or car phone to call for emergency assistance. This is particularly dire if the accident occurs in a location where there are no bystanders who can assist the driver or passenger.

SUMMARY

Embodiments are disclosed for crash detection on one or more mobile devices (e.g., smartwatch and/or smartphone). In some embodiments, a method comprises: detecting, with at least one processor, a crash event on a crash device; extracting, with the at least one processor, multimodal features from sensor data generated by multiple sensing modalities of the crash device; computing, with the at least one processor, a plurality of crash decisions based on a plurality of machine learning models applied to the multimodal features; and determining, with the at least one processor, that a severe vehicle crash has occurred involving the crash device based on the plurality of crash decisions and a severity model.

In some embodiments, the method further comprises responsive to a severe crash being determined, presenting a notification on a screen of the crash device requesting a response from a user of the crash device.

In some embodiments, the method further comprises determining whether the crash device is stationary for a predetermined period of time; responsive to the crash device being stationary for the predetermined period of time, starting a timer or counter; determining that the timer or counter meets a threshold time or count, respectively; and escalating the notification.

In some embodiments, the method further comprises determining, as a result of the escalating, that no response to the notification was received after the threshold time or count was met, automatically contacting emergency services using one or more communication modalities of the crash device.

In some embodiments, the method comprises: sending, to a network server computer, at least one of the multimodal features, crash decisions, inference of a severe crash or user interactions with the notification; receiving, from the network server, at least one update to at least one parameter of at least one machine learning model or the severity model; and updating, with the at least one processor, the at least one parameter with the at least one update.

In some embodiments, at least one of the multimodal features is a deceleration pulse signature present in acceleration data.

In some embodiments, at least one of the multimodal features is sound pressure level of audio data captured by at least one microphone of the crash device.

In some embodiments, at least one of the multimodal features is a pressure change due to airbag deployment in the vehicle.

In some embodiments, at least one of the multimodal features is a drop in speed of the crash device.

In some embodiments, the method further comprises: receiving, with the at least one processor, crash related features from a companion device coupled to the crash device; computing, with the at least one processor, a plurality of crash decisions based on a plurality of machine learning models applied to the multimodal features and crash related features; and inferring, with the at least one processor, that a severe vehicle crash has occurred involving the crash device based on the plurality of crash decisions and a severity model.

In some embodiments, the method further comprises matching epochs for the multimodal features with epochs for the additional multimodal features to remove misalignment between epoch boundaries.

Other embodiments are directed to an apparatus, system and computer-readable medium.

Particular embodiments described herein provide one or more of the following advantages. The disclosed crash detection embodiments allow a crash device (e.g., smartphone, smartwatch) to automatically detect when a user is in a car crash, while also reducing the occurrence of false crash detections. If a crash is detected, the crash device presents a user interface that alerts the user for a period of time. If the user is responsive, they can swipe the screen or provide other input to call emergency services immediately or dismiss the alert if the user does not need emergency services. If after the time period expires there is no user interaction with the crash device, a countdown starts. When the countdown ends, emergency services and/or the user's emergency contact list are automatically contacted via a phone call or text message.

BRIEF DESCRIPTION OF THE DRAWINGS

FIG. 4A is table listing observed sensor signals and corresponding sensing modes for sensors of a crash device, according to one or more embodiments.

FIG. 4B is a graph of deceleration pulse and impact signatures in inertial sensor signals indicative of a crash, according to one or more embodiments.

FIG. 4C is a graph of a loud audio signal indicative of a crash, according to one or more embodiments.

FIG. 4D is a graph of sudden pressure change indicative of airbag deployment during a crash, according to one or more embodiments.

FIG. 4E is a graph of a large speed drop indicative of a car crash, according to one or more embodiments.

FIG. 5A is a graph of inertial acceleration, according to one or more embodiments.

FIG. 5B is a graph of normalized horizontal acceleration, according to one or more embodiments.

FIG. 7A is a graph showing sound pressure level (SPL) during a crash, according to one or more embodiments.

FIGS. 12A and 12B illustrate epoching for time alignment for multimodal crash detection, according to one or more embodiments.

DETAILED DESCRIPTION

Crash Detection Overview

Figure 1:
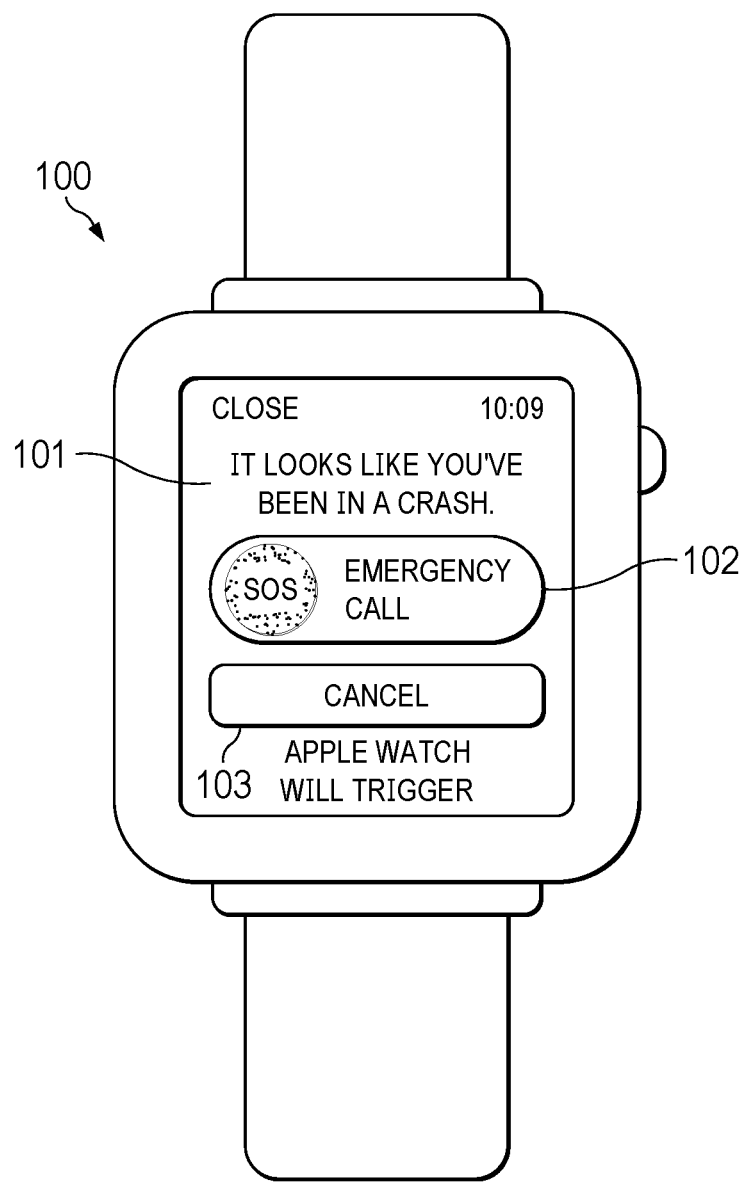
FIG. 1 illustrates a smartwatch for crash detection, according to one or more embodiments.

FIG. 1 illustrates an example crash device, a smartwatch 100, for crash detection, according to one or more embodiments. Other examples of crash devices include a smartphone and tablet computer. The disclosed crash detection embodiments allow a crash device, such as smartwatch 100, to detect when a user is in a crash, while also reducing the occurrence of false crash detections. In some embodiments, if a crash is detected, smartwatch 100 presents user interface (UI) 101 with a wellness check for a predetermined time period. If the user is responsive, the user can swipe "SOS Emergency Call" affordance 102 to contact emergency services, or touch "Cancel" affordance 103 to cancel the alert. If, however, after the predetermined time period expires the user is unresponsive (e.g., there is no user interaction with UI 101), a countdown timer starts (e.g., counting down from 10). When the countdown ends, emergency services and/or the user's emergency contact list is automatically contacted through one or more communication modalities (e.g., via a phone call or text message).

In some embodiments, when emergency services pick up the SOS call, a digital assistant on smartwatch 100 begins to play an audio message from a loudspeaker on smartwatch 100 indicating that the user was in an accident. In some embodiments, the audio message is played on a loop with a predetermined number of seconds of silence between each replay. The digital assistant also relays the user's estimated location (e.g., latitude and longitude of smartwatch 100) and a search radius to emergency services. In some embodiments, the user's estimated location can be announced during the call or presented in a text message or email, and/or also announced through the loudspeaker of smartwatch 100 in case wireless communications are in operable at the accident location (e.g., no signals).

Figure 2:
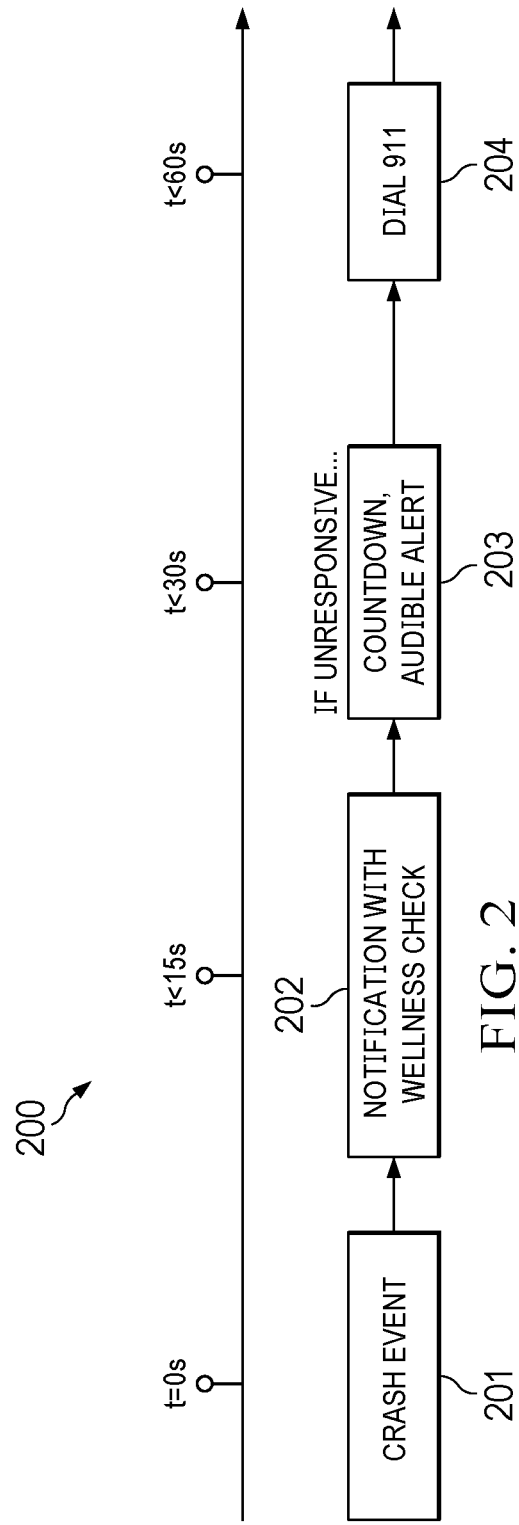
FIG. 2 is a crash detection timeline, according to one or more embodiments.

FIG. 2 is a crash detection event timeline 200, according to one or more embodiments. At t=0 seconds the crash event is detected 201 by smartwatch 100. At t=15 seconds a notification is presented 202 on UI 10 with a wellness check, as shown in FIG. 1. If the user is unresponsive for N seconds (e.g., N=30 seconds) after the notification is sent, a countdown is started with an audible alert 203. If after the countdown finishes there is no response from the user (e.g., no interaction with UI 101), emergency services are contacted 204 (e.g., 911 is dialed). This example timeline 200 is for illustrative purposes. Other timelines with different time limits, or different numbers and/or types of alert escalations can also be used.

Example Crash Detection System

Figure 3:
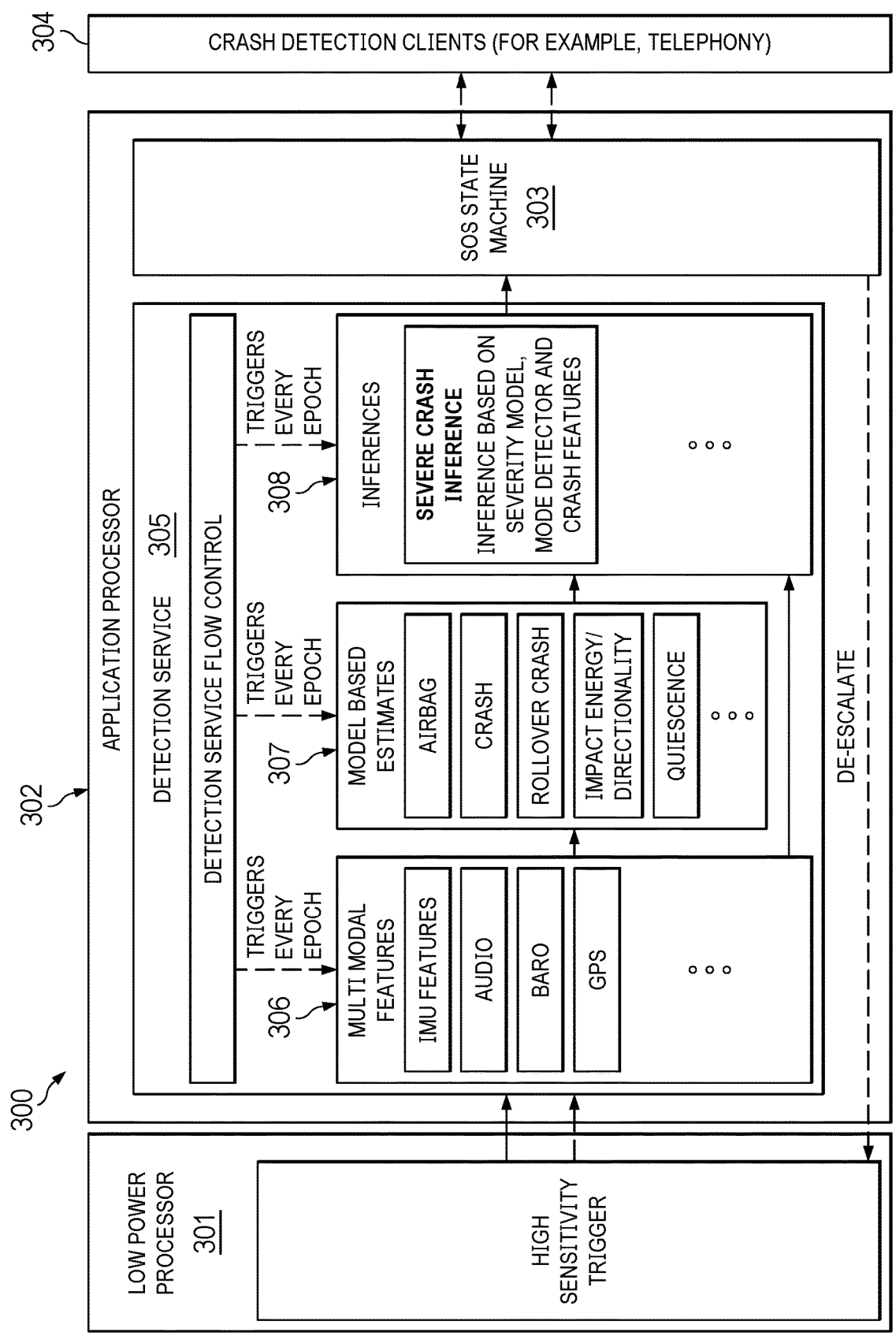
FIG. 3 is a block diagram of a crash detection system, according to one or more embodiments.

FIG. 3 is a block diagram of a crash detection system 300 for a mobile device, according to one or more embodiments. System 300 could be implemented on, for example, the smartwatch 100 shown in FIG. 1.

System 300 includes low-power processor 301, application processor 302 (also referred to herein as "always on processor" (AOP)), SOS state machine 303 and crash detection clients 304. Low-power processor 301 consumes less power than application processor 302. For at least this reason, low-power processor 301 is continuously running to detect triggers that are indicative of a severe car crash (hereinafter referred to as "crash event triggers"). The crash event triggers can be generated based on, for example, various observed signals from multiple sensors on the crash device. Detection service 305 running on application processor 302 monitors for crash trigger event signals sent by low-power processor 301. When a trigger event (see dashed line) is received, an epoch is started and detection service 305 extracts multimodal features 306 from sensor streams output by the sensors. For example, detection service 305 retrieves samples of sensor data from an IMU buffer, audio buffer, barometer buffer and GPS buffer for every epoch. Multimodal features 306 are extracted from the buffered sensor data (e.g., acceleration, rotation rate, pressure, speed, audio snippets) and input into machine learning models 307 for generating crash decisions, such as airbag deployment, severe crash, rollover crash, impact energy/directionality and quiescence. More particular, models 307 are applied to multimodal features to generate estimates of whether an airbag was deployed, whether a crash occurred, whether a roller over crash occurred, whether there was impact energy/directionality indicative of a crash and quiescence (e.g., no observation signals present) period indicative of a crash (referred to herein as "crash decisions"). Models 307 can implement any suitable supervised or unsupervised machine learning models, including but not limited to: regression models (e.g., linear, logistic), decision trees, random forest, support vector machines, neural networks (e.g., convolutional neural networks), classifiers, Naive Bayes, clustering, dimensionality reduction (e.g., principal component analysis (PCA)), etc.

The crash decisions output by models 307 are input into inference engine 308. Inference engine 308 uses a severity model, mode detector and crash features to infer whether a severe crash has occurred. In some embodiments, inference engine 308 outputs a probability that a severe crash occurred based on the crash decisions.

Figure 8:
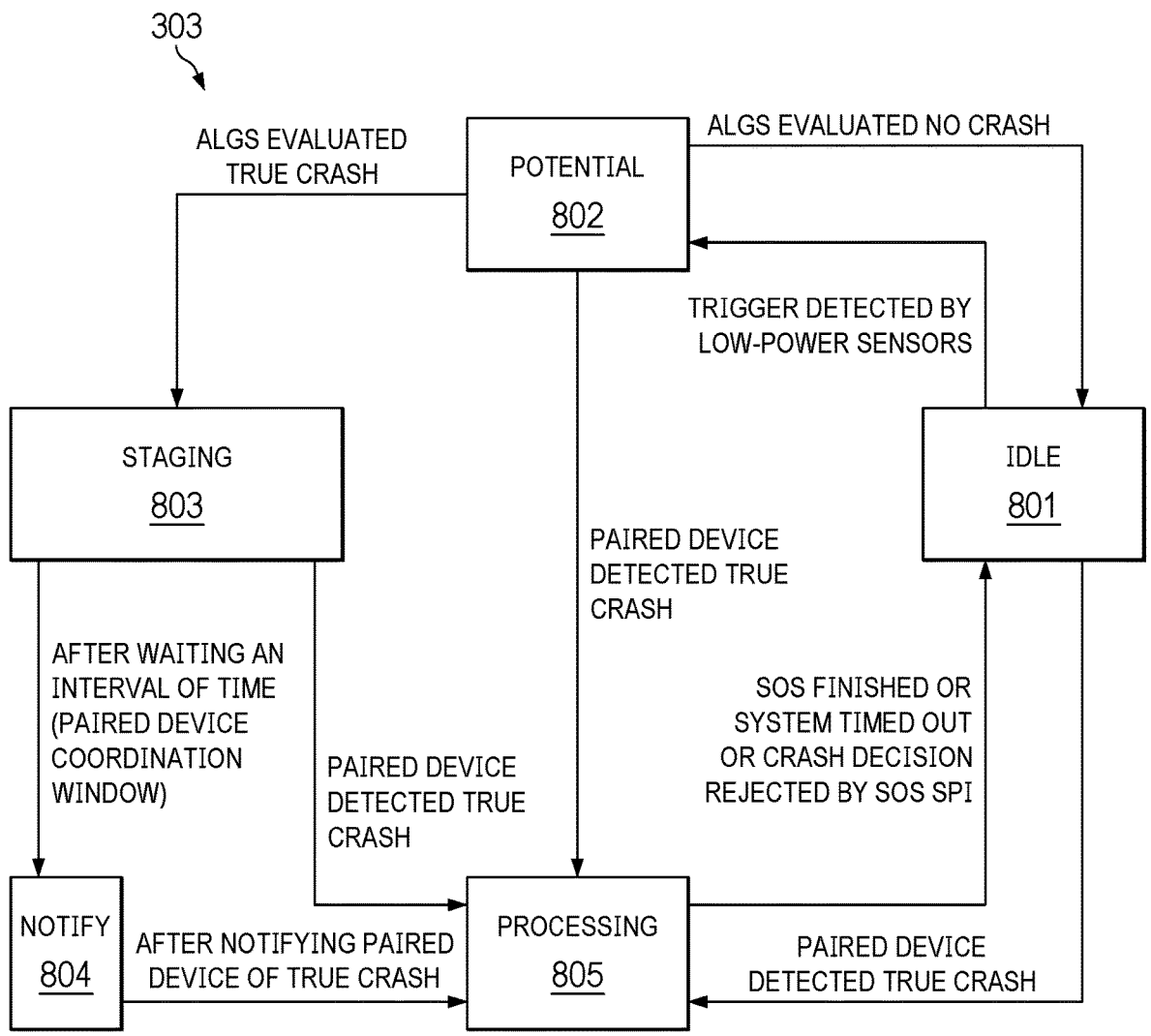
FIG. 8 is a state machine diagram for triggering a distress signal (hereinafter, "SOS signal"), according to one or more embodiments.

If the probability is above a specified threshold, a severe crash is predicted and sent to SOS state machine 303, which performs UI escalation as described in reference to FIG. 8. If the escalation level rises to the level of contacting emergency services (e.g., unresponsive user after a time period/countdown), then crash clients 304 (e.g., a telephony application, messaging application, email application, digital assistant) are notified, so that emergency services and/or emergency contacts are called, as described in reference to FIGS. 1 and 2. If SOS state machine 303 de-escalates (e.g., user touches cancel affordance 103 before the time period/countdown finishes), then a de-scalation signal is relayed to low-power processor 301 to reset the trigger process.

FIG. 4A is a table listing observed signals and corresponding sensing modes for sensors of a crash device (e.g., smartwatch 100), according to one or more embodiments. Sensors can include but are not limited to individual inertial sensors (e.g., accelerometers, gyros) or an inertial measurement unit (IMU) containing multiple inertial sensors, signals from a global navigation satellite system (GNSS), such as the Global Positioning System (GPS), BeiDou, etc., pressure changes measured by a pressure sensor (e.g., a barometer) and audio signals captured by one or more microphones of the crash device. Some examples of observed signals include but are not limited to pre-crash signatures captured in IMU data and GPS data, impact size determined from IMU data, roll-over detection determined from IMU data and audio data, airbag deployment determined from pressure data and audio data, crash sounds determined from audio data and post-crash signatures determined from IMU data and GPS data.

FIG. 4B is a graph of deceleration pulse and impact signatures in inertial sensor data that are indicative of a crash, according to one or more embodiments. The vertical axis is acceleration, and the horizontal axis is time (sec). The acceleration is obtained from an IMU of the crash device. The signature is characterized by sharp pulses exceeding a specified magnitude over a specified duration. The signatures can be obtained empirically from, e.g., crash test data.

FIG. 4C is a graph of loudness of an audio snippet that is indicative of a crash, according to one or more embodiments. The vertical axis is loudness (dB), and the horizontal axis is time (seconds). The audio can be obtained by sampling the output of one or more microphones of the crash device and storing the samples in a buffer. The audio signature is characterized by a rise in volume level from an ambient audio baseline volume over a specified duration (rise time), followed by a specified duration at the higher volume level, followed by a return to the ambient audio baseline volume level. The signature can be obtained empirically from, e.g., crash test data.

FIG. 4D is a graph of sudden pressure change indicative of airbag deployment during a crash, according to one or more embodiments. The vertical axis is pressure (kPA), and the horizontal axis is time (seconds). A change in pressure can be obtained from a barometer of the crash device. The pressure signature is characterized by a sudden rise in pressure from a zero-baseline pressure (rise time), followed by a return to baseline pressure over a specified duration. The signature can be obtained empirically from, e.g., crash test data.

FIG. 4E is a graph of a large GPS speed drop indicative of a car crash, according to one or more embodiments. The vertical axis is GPS speed, and the horizontal axis is time. The speed signature is characterized by large speed drop from a nominal speed to a lower speed over a specified duration. The signature can be obtained empirically from, e.g., crash test data.

FIG. 5A is a graph of inertial acceleration, according to one or more embodiments. The accelerometer in the IMU is used to measure sudden deceleration during the impact of a crash. The normalized average deceleration is computed as shown in Equation [1] from the horizontal components of acceleration $a_x$, $a_y$:

$$\text{AveDeceleration} = \|\Sigma_t (a_x, a_y)\|_2. \qquad [1]$$

FIG. 5B is a graph of normalized horizontal acceleration, which is indicative of a crash. The crash pulse duration shown in the figure is indicative of a crash.

Figure 5C:
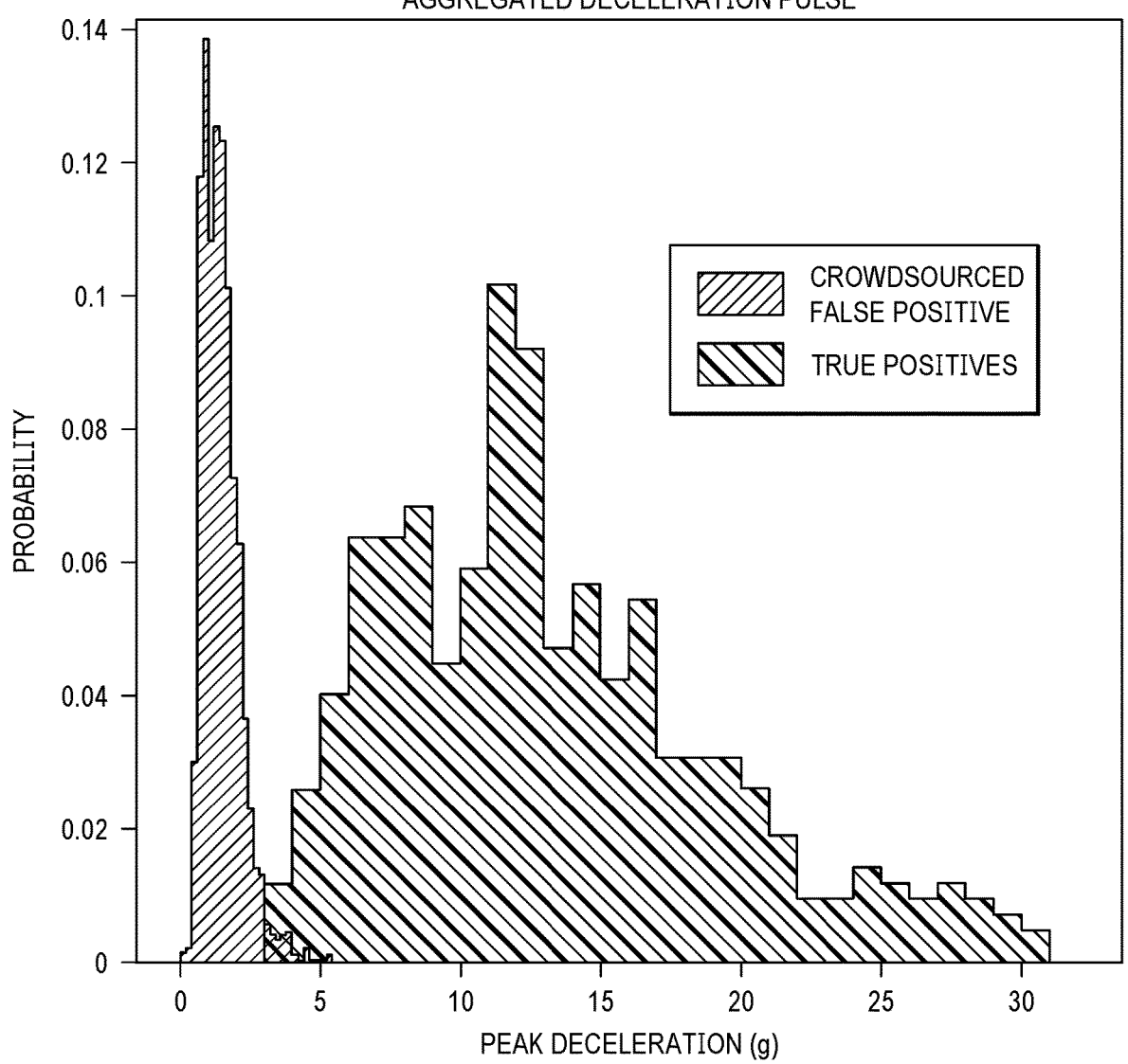
FIG. 5C is a histogram of probability versus peak deceleration for aggregated deceleration pulses, according to one or more embodiments.

FIG. 5C is a histogram of probability versus peak deceleration for aggregated (e.g., crowdsourced) deceleration pulses, according to one or more embodiments. The vertical axis is probability, and the horizontal axis is peak deceleration. Crowdsourced false positives and true positives are shown. Crowdsourced data was collected from test devices to determine false positives (non-crashes) and true positives (crashes). As can be observed, the deceleration pulse signature is a good indicator of a crash when peak acceleration is greater than 5 g.

Figure 6A:
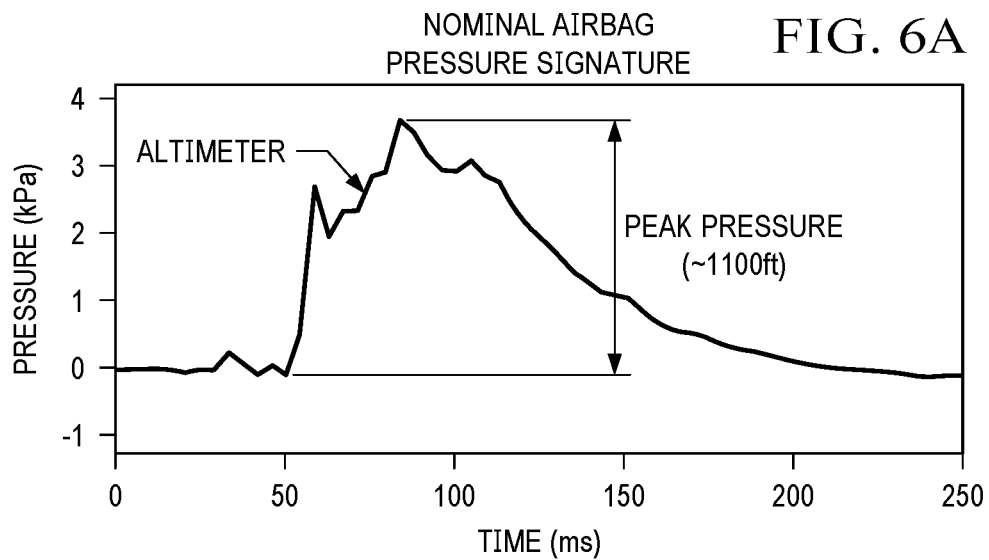
FIG. 6A is a graph of a nominal airbag pressure signature due to deployment during a crash, according to one or more embodiments.

FIG. 6A is a graph of a nominal airbag pressure signature due to deployment during a crash, according to one or more embodiments. This feature detects large pressure disturbances caused by airbag deployment and cabin deformation. The significance of this feature is that airbags are three times more likely to deploy in a severe crash making this feature a good indicator of a severe crash. The vertical axis is pressure (kPa), and the horizontal axis is time (ms). The nominal airbag pressure signature is shown, which is characterized by a sudden peak in pressure over a specified duration.

Figure 6B:
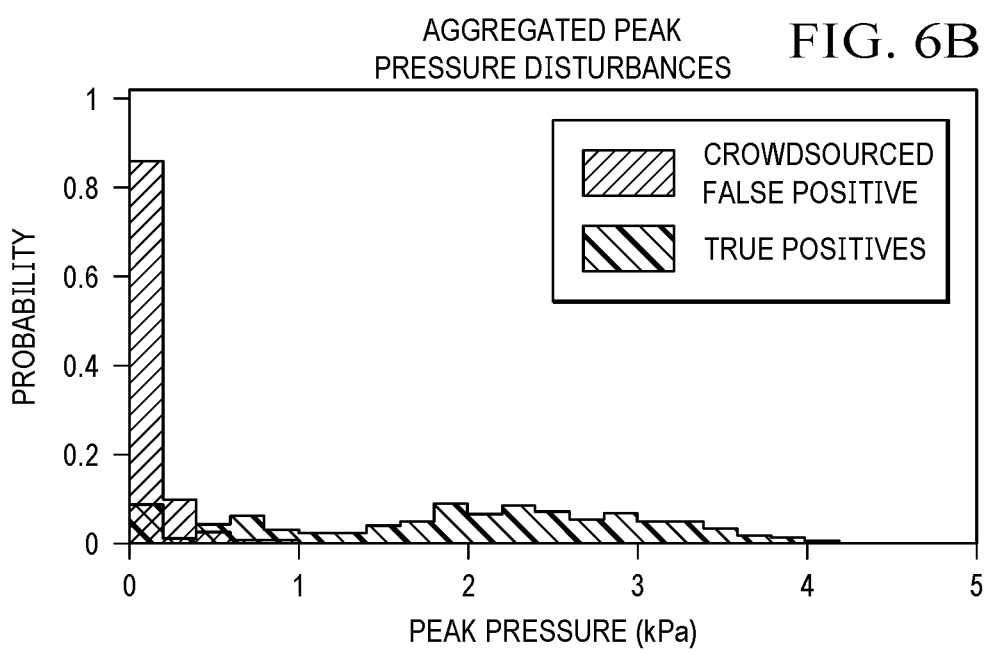
FIG. 6B is a graph of probability versus peak pressure for an aggregated peak pressure disturbance, showing crowdsourced false positives and true positives for a crash, according to one or more embodiments.

FIG. 6B is a graph of probability versus peak pressure for aggregated peak pressure disturbances. Crowdsourced false positives (non-crash) and true positives (crash) are shown. As can be observed, the airbag pressure signature is a good indicator of a crash when the pressure exceeds about 0.5 kPa.

FIG. 7A is a graph showing sound pressure level (SPL) during a crash, according to one or more embodiments. The vertical axis is sound pressure level (dB), and the horizontal axis is time (ms). The human pain threshold is shown as well as a jackhammer SPL at a distance of 2 m. During a crash, an SPL burst rises above 130 dB within a specified duration (e.g., 200 ms).

Airbag deployment and crushing sounds of metal and glass can be used as sound features. Sound features are less sensitive to car windows being closed that the air pressure signature described in reference to FIG. 6C. Sound features have a high data rate that offers numerous frequency band features. Sound features are also independent of the coupled or projectile state of the crash device.

Figure 7B:
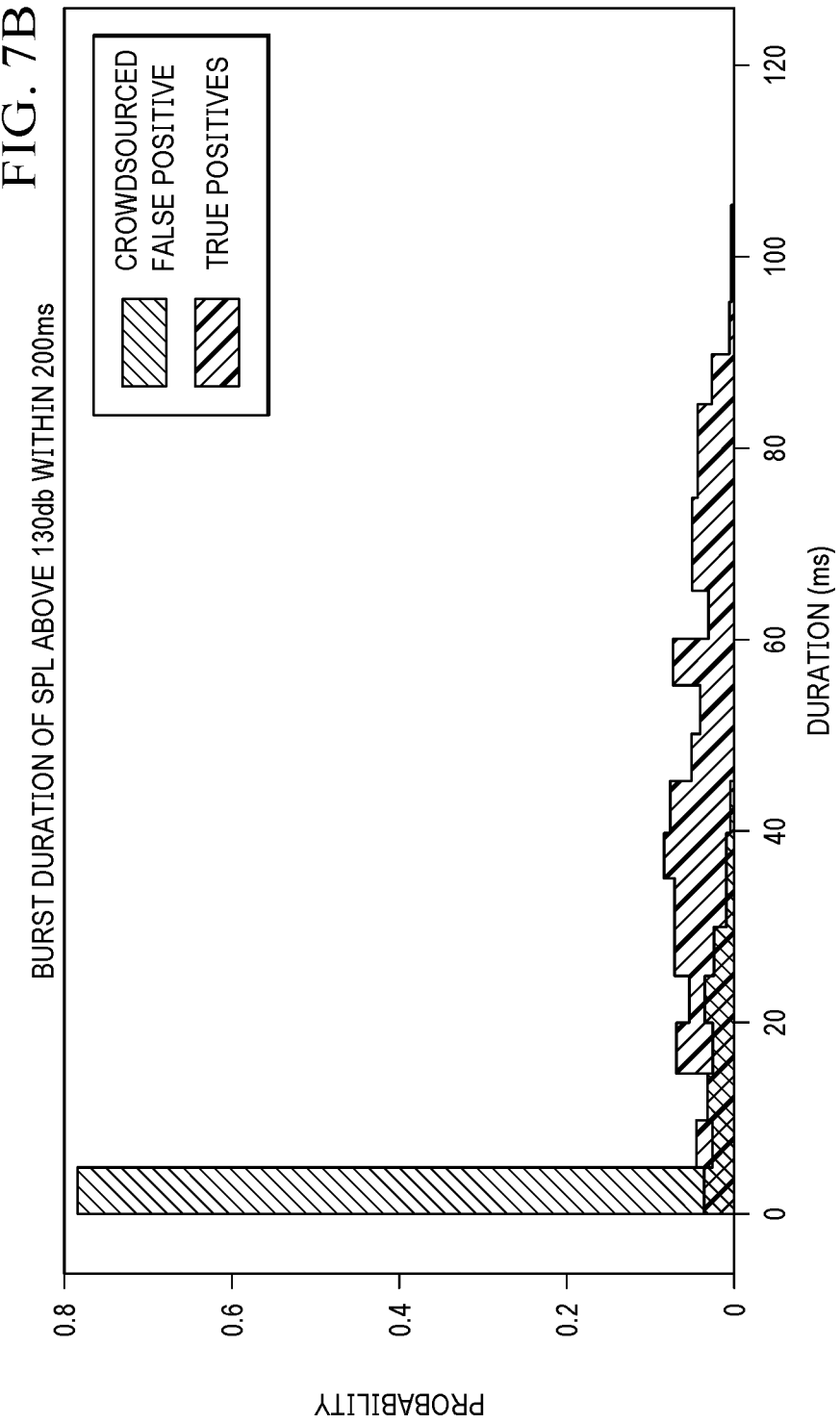
FIG. 7B is a graph of probability versus duration for a burst duration of SPL above 130 db within 200 ms, showing crowdsourced false positives and true positives for a crash, according to one or more embodiments.

FIG. 7B is a histogram of probability versus SPL burst duration. Crowdsourced false positives and true positives are shown. This histogram shows that burst duration of SPL above 130 dB within 200 ms is a good indicator of a crash.

FIG. 8 is a state machine diagram triggering a distress signal (hereinafter, "SOS signal"), according to one or more embodiments. When a crash is detected, SOS state machine 303 (FIG. 3) is entered. SOS state machine 303 synchronizes flow with both local and paired device crash detection processes. In some embodiments, SOS state machine 303 includes the states: IDLE 801 POTENTIAL 802, STAGING 803, NOTIFY 804 and PROCESSING 805.

When low-power processor 301 (FIG. 3) detects a crash trigger event, SOS state machine 303 transitions to POTENTIAL 802. If inference engine 308 infers a true crash, SOS state machine 303 transitions to STAGING 803; otherwise, SOS state machine 303 transitions back to IDLE 801. If SOS state machine 3030 is in STAGING 803 and a paired device detects a true crash, SOS state machine 303 transitions to PROCESSING 805. Also, if SOS state machine 303 is in IDLE 801 and the paired device detects a true crash, SOS state machine 303 transitions to PROCESSING 805.

After waiting an interval of time (a paired device coordination window) in STAGING 803, SOS state machine 303 transitions to NOTIFY 804. After notifying the paired device of a true crash, SOS state machine 303 transitions to PROCESSING 805. SOS state machine 303 transitions to IDLE 801 when the SOS alert is finished or the system times out or a crash decision is rejected by the SOS UI escalation.

Figure 9A:
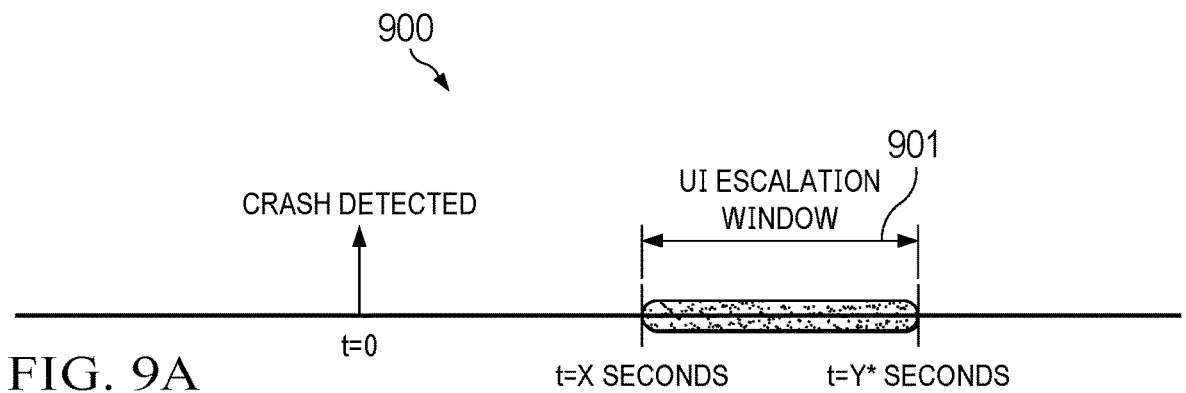
FIG. 9A is a timeline for safely notifying a user after a detected crash, according to one or more embodiments.

FIG. 9A is a timeline 900 for safely notifying a user after a detected crash, according to one or more embodiments. Any interaction with a crash device while driving can be distracting. As such, the UI notification is delayed by sensing that the crash device is not moving (also referred to as "stationarity") through space and/or is otherwise a safe time to present a notification. Stationarity can be determined by a number of sensing modalities including but not limited to: GNSS, WIFI, altimeter and integration with the vehicle's computer (e.g., speedometer).

In timeline 900, UI escalation window 901 starts X seconds after a crash is detected and continues for a specified period of time. In the event of a crash, often a user's vehicle is not immediately stationary and/or the vehicle becomes stationary but the user than proceeds to start driving to move to a safe location (e.g., shoulder of a highway). In such scenarios, the behavior is to wait a sufficient duration for stationarity before presenting the notification to ensure the user is settled. In the event stationarity cannot be determined by the sensing modalities, a notification (e.g., a UI with wellness check) is presented on a display of the crash device. In the event a false positive crash is detected, and the user continues to move at driving speed, the notification expires after waiting a duration that is sufficient for stationarity to be detected.

Figure 9B:
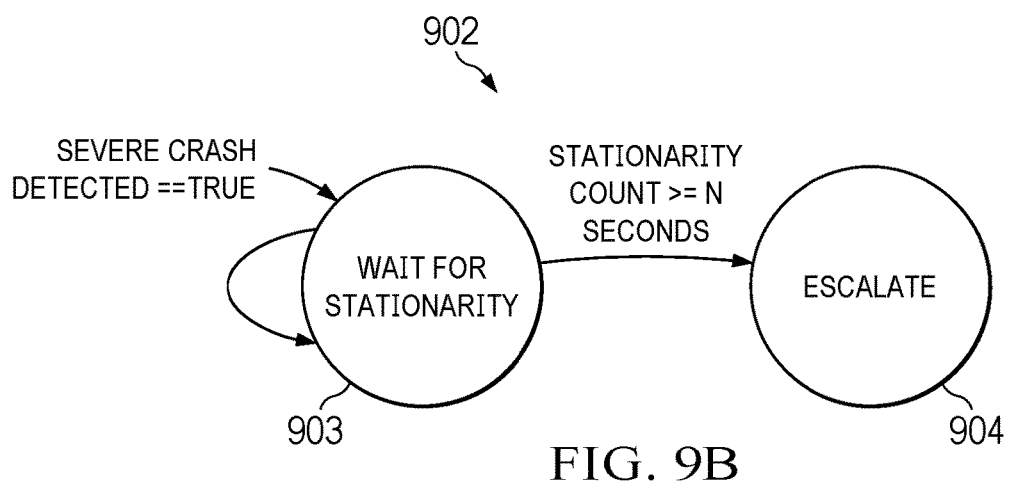
FIG. 9B is a state machine for an alert escalation flow, according to one or more embodiments.

FIG. 9B is an example state machine 902 for controlling the UI escalation flow, according to one or more embodiments. If a severe crash is detected, state machine 902 waits for stationarity 903 for a predetermined amount of time (e.g., using a counter) as determined by one or a combination of sensing modalities. When the stationarity count meets a threshold count (e.g., greater than or equal to a threshold count), state machine 902 transitions to an escalating state 904 and UI escalation window 901 is presented on the crash device.

In some embodiments, a stationarity check that must be met before a UI notification includes meeting a specified GPS speed threshold speed (e.g., 3 mph) and meeting a specified time count (e.g., >=30 seconds). A time counter is reset if the GPS speed meets a specified threshold (e.g., >5 mph). If GPS speed is not available, then the operation is not performed. In some embodiments, the check for stationarity has several boundary conditions. For example, the UI will not escalate before P seconds (e.g., 20 seconds), and if not escalated by Q seconds (e.g., 60 seconds), the GPS history is checked for the past M samples (e.g., 10 samples), and UI is then escalated using a more relaxed stationarity check. An example relaxed stationarity check includes an equivalent stationarity sample, such as GPS speed meeting a threshold or a missing GPS sample, and a number of equivalent stationarity samples that meets a specified threshold Z of W samples (e.g., 8 of 12 samples).

Figure 10:
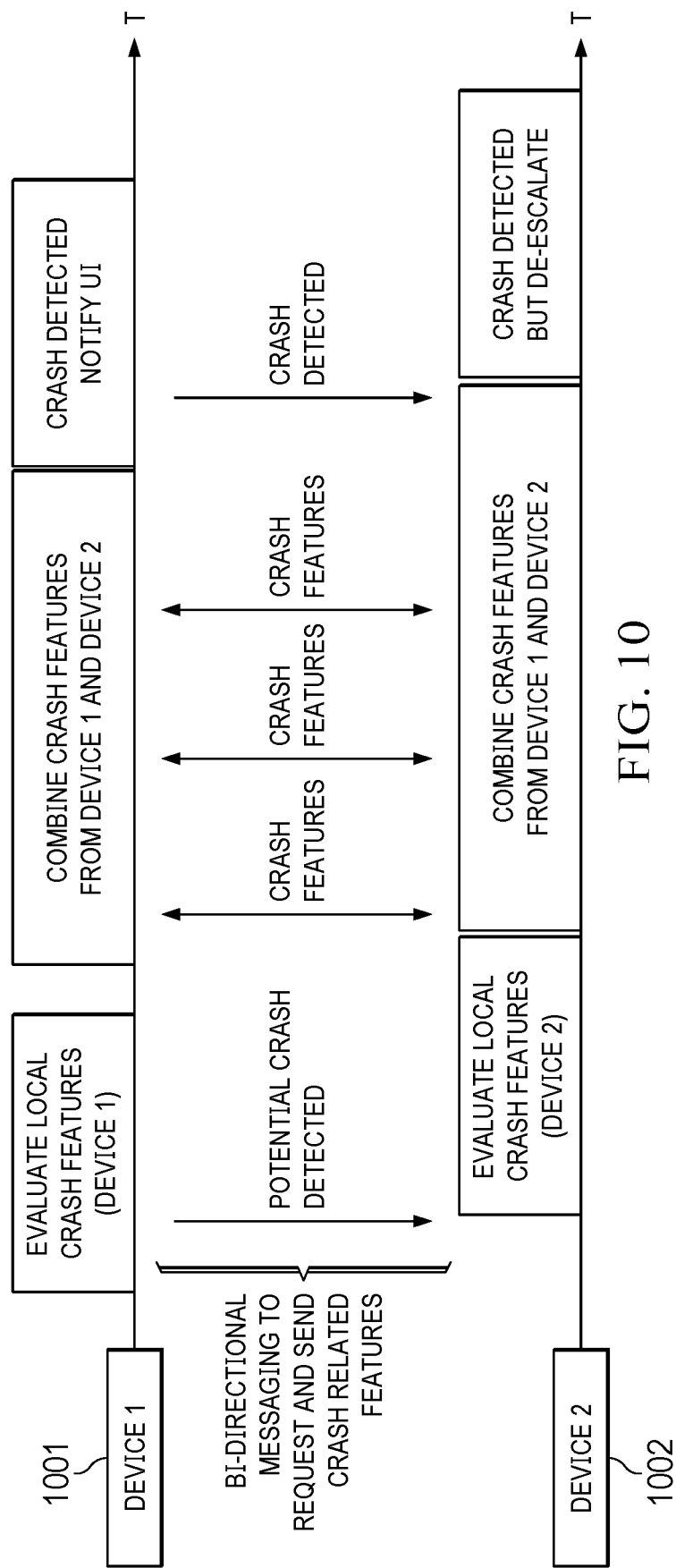
FIG. 10 illustrates using multiple crash devices to detect crashes, according to one or more embodiments.

FIG. 10 illustrates using multiple devices to detect crashes, according to one or more embodiments. During a car crash multiple devices 1001, 1002 in the vehicle will detect crash signatures, including but not limited to smartwatches, smartphones and tablet computers. By combining the information from the multiple devices 1001, 1002, crash detection performance increases. As the vehicle environment during a crash will have similar crash signatures across crash devices, in some embodiments all available crash devices and their respective sensing modalities are used to combine crash data to detect a crash with the highest confidence. In this embodiment, crash data is shared between crash devices 1001, 1002, and if the crash data indicates that both crash devices 1001, 1002 detected crashes, arbitration logic is used to preferentially select one of crash devices 1001, 1002 to raise the UI escalation.

Referring again to FIG. 10, crash device 1001 (e.g., a smartwatch) and crash device 1002 (e.g., a smartphone) engage in bi-directional messaging to request and send crash related features. In the example shown, crash device 1001 evaluates crash features detected by it sensing modalities and sends the features to crash device 1002. Similarly, crash device 1002 evaluates crash features detected by its own sensing modalities and sends those features to crash device 1001. Each crash device 1001, 1002, combines their locally detected and received crash features to infer that a severe crash has occurred. If a severe crash is inferred, crash device 1001 initiates UI escalation and crash device 1002 de-escalates UI escalation because UI escalation is handled by crash device 1001.

Figure 11:
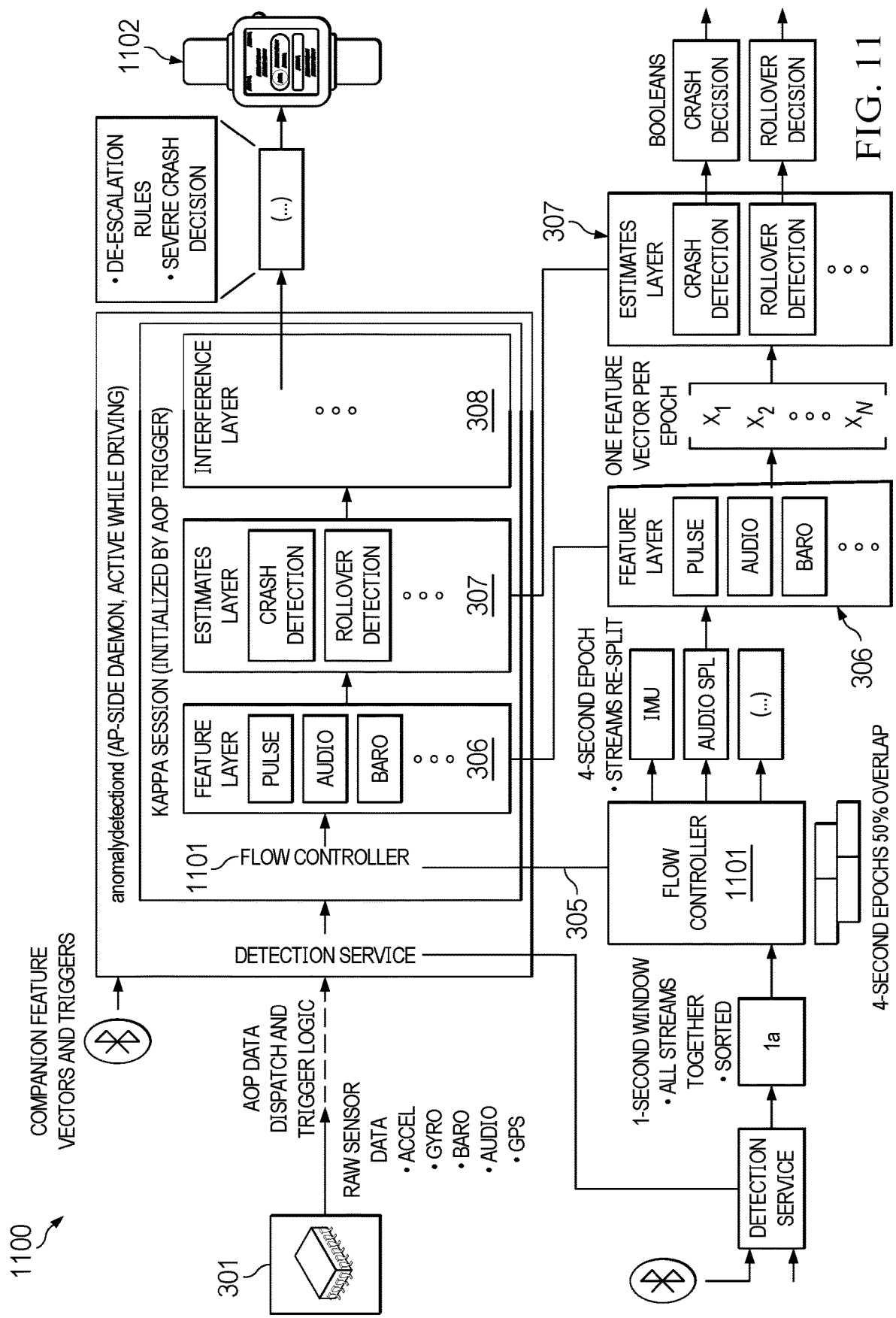
FIG. 11 illustrates a cross-section of a software stack for crash detection, according to one or more embodiments.

FIG. 11 illustrates a cross-section of a software stack 1100 for crash detection, according to one or more embodiments. Referring to the left of the figure, low-power processor 301 aggregates raw sensor data from various sensor data streams, such as IMU data (acceleration, rotation rate, altitude), barometer (pressure change), audio (audio samples captured by microphone(s)) and GPS data (e.g., GPS speed). The sensor data is sent to application processor 302 upon a crash trigger event. If a companion device (e.g., smartphone) is available, crash features are also provided to application processor 302 through a wireless communication link (e.g., Bluetooth) between the crash device and companion device.

Detection service 305 running on application processor 302 implements a flow controller 1101 that manages a crash detection processing pipeline that includes multimodal features layer 306, estimates layer 307 and inference layer 308. Inference layer 308 outputs a severe class decision based on crash decisions output by machine learning models implemented estimates layer 307 and sends the severe crash decision to SOS state machine 303. SOS state machine 303 initiates a UI escalation 1102 or de-escalation using timers, countdowns and whether or not the user is responsive (e.g., initiates an SOS call or cancels) to the UI escalation.

As shown at the bottom of FIG. 11, in a first n-second window (e.g., n=1 sec), detection service 305 combines the sensor data streams together and sorts the streams for flow controller 1101. Flow controller 1101 re-splits the streams into N measurement/observation epochs (e.g., N=4). The streams are input into feature layer 306 which extracts features from the sensor streams, and outputs one feature vector per epoch that includes all the features.

The feature vector per epoch is input into estimates layer 307, which computes crash decisions (e.g., crash, rollover crash, airbag deployment, impact energy, etc.) based on various sensor data using machine learning models. The output of estimates layer 307 are input into inference layer 308, which predicts/infers that severe crash has occurred based on a severity model. For example, inference layer 308 generates a probability that a severe crash occurred if the probability meets (e.g., exceeds) a specified threshold probability.

FIG. 12A illustrates time alignment for multi-modal crash detection for a nominal case on a single device, according to one or more embodiments. In this example, 4 epochs are shown: $P_0$, $P_1$, $P_2$ and $P_3$, and there is one feature vector per epoch. In some embodiments, an epoch is n-seconds in duration and the epochs are overlapping in time (e.g., 50% overlap). In the example shown, $P_1$ overlaps $P_0$ and $P_2$, and $P_2$ overlaps $P_1$ and $P_3$. In this example, the epochs containing the crash event are $P_1$ and $P_2$. In epochs $P_1$ and $P_2$, the deceleration pulse feature report is set to IMU=True (a deceleration pulse was detected) and the audio feature report is set to isAudio=True (audio of the crash was captured). In this example, the crash and rollover models in estimates layer 307 merge these features to make a crash decision (a crash was detected) and rollover decision (the crash was a roll over crash which is usually more severe), respectively.

Figure 12B:
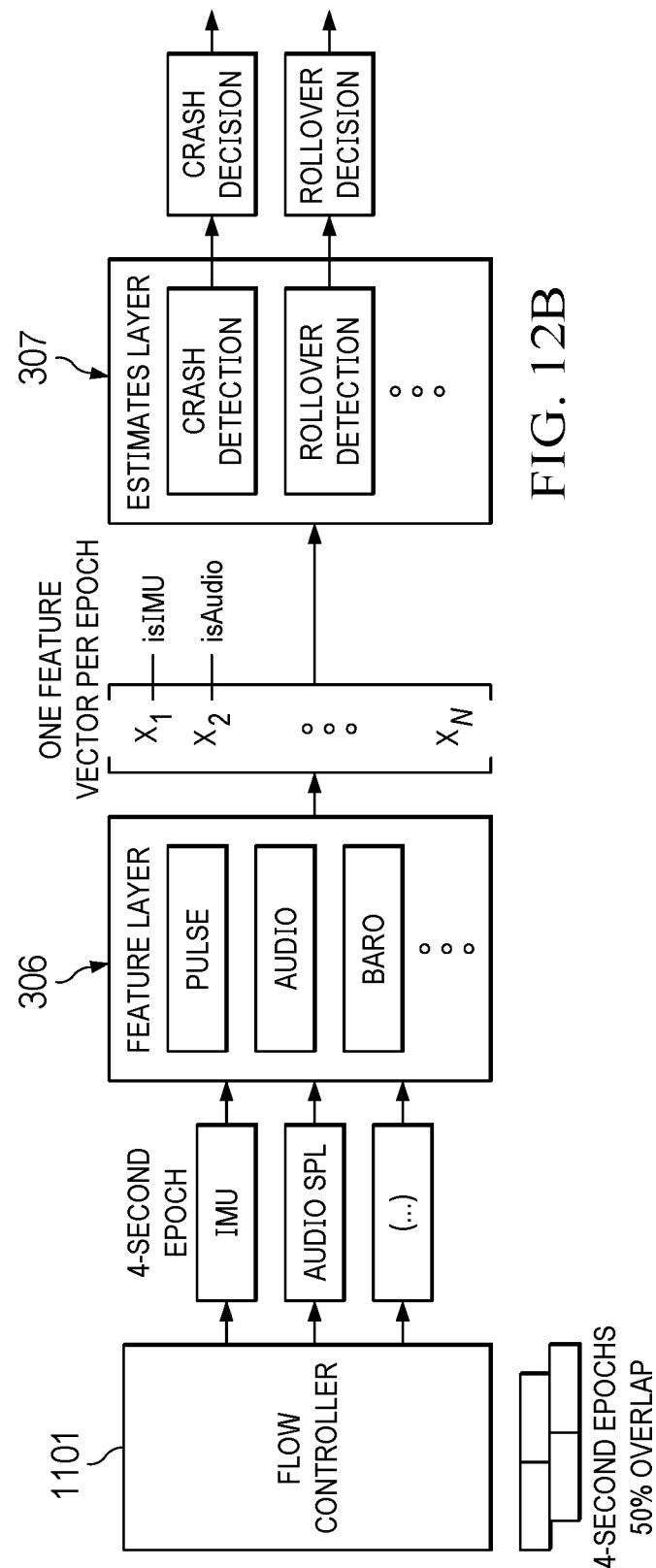

FIG. 12B illustrates the use of 4-second epochs with 50% overlap which are input into feature layer 306, which outputs one feature vector per epoch, which is then input into estimates layer 308, which outputs crash and rollover crash decisions.

Figure 13A:
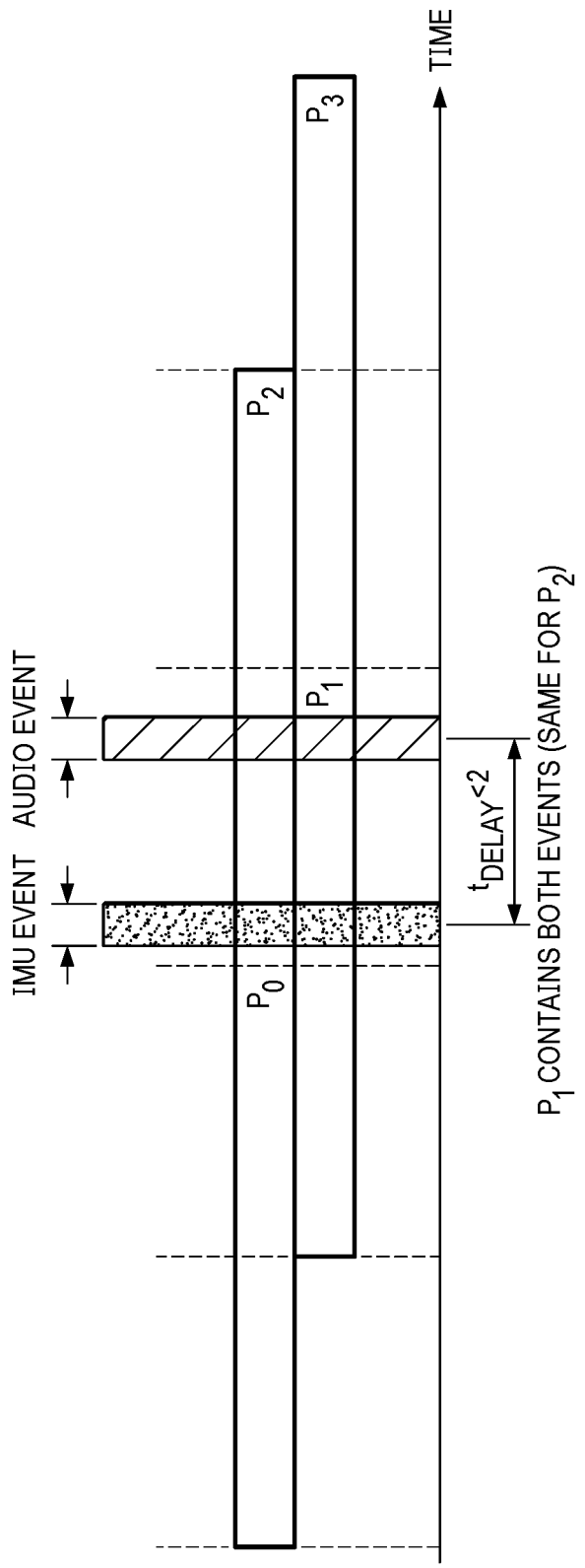
FIGS. 13A-13C illustrate modeling false positive risk due to timing, according to one or more embodiments.
Figure 13B:
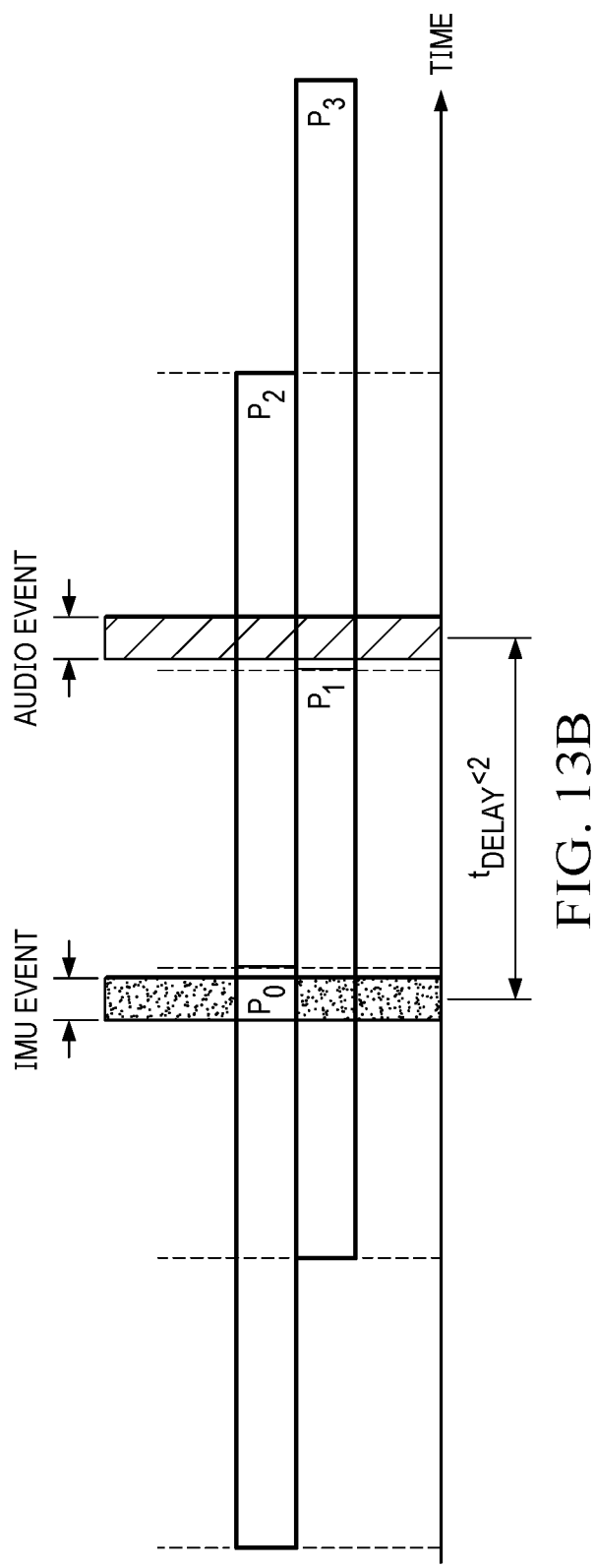
Figure 13C:
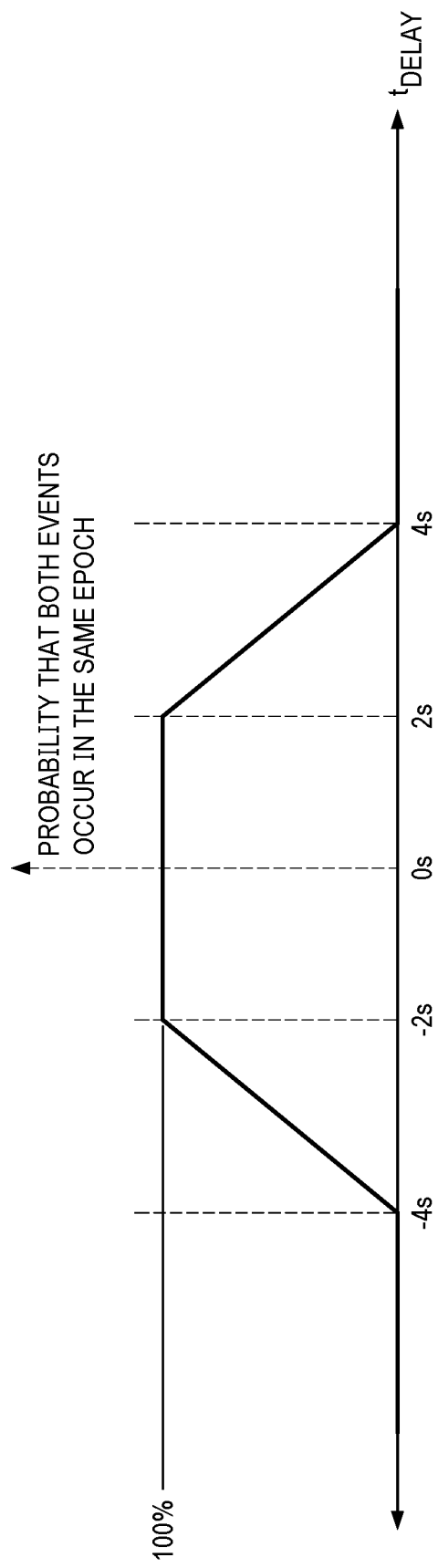

FIGS. 13A-13C illustrate modeling false positive risk due to timing, according to one or more embodiments. In the example shown, the overlapping epochs $P_0$, $P_1$, $P_2$ and $P_3$ are the same as shown in FIG. 12A. In FIG. 13A, $P_1$ and $P_2$ contain an IMU event and audio event when the events are separated by a time delay $t_{delay}$ that is less than 2 seconds. In FIG. 13B, no epoch contains both the IMU and audio events when the events are separated by a time delay $t_{delay}$ that is greater than 2 seconds. FIG. 13C illustrates that the probability that both events fall in the same epoch is 100%, if $t_{delay}$ is less than 2 seconds. Accordingly, to reduce false positives due to timing, the features must be separated in time by no more than 2 seconds.

Figure 14A:
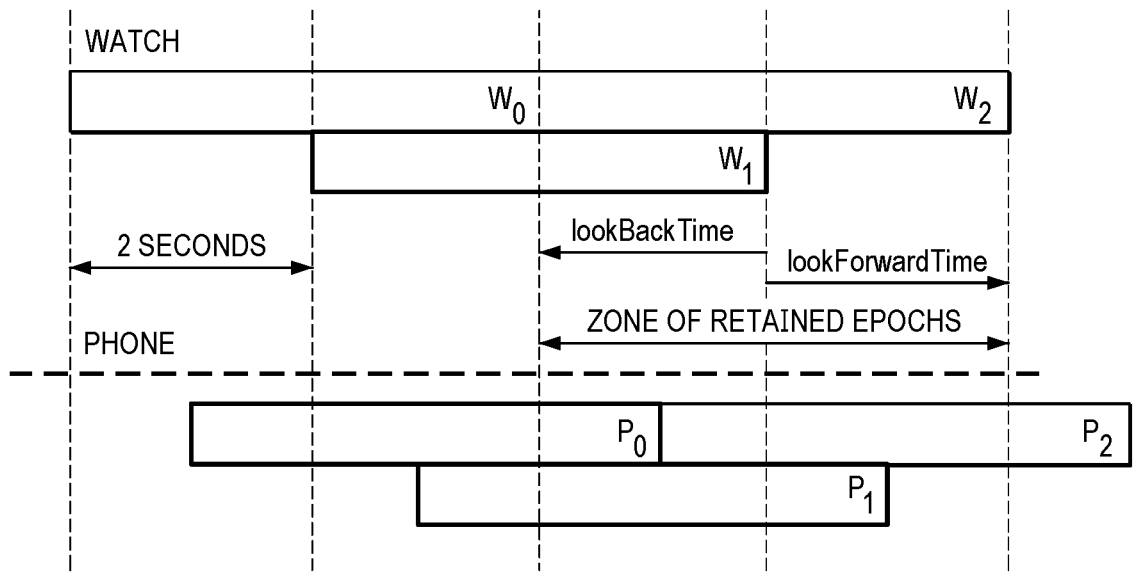
FIGS. 14A and 14B illustrate matching epochs across two crash devices, according to one or more embodiments.
Figure 14B:
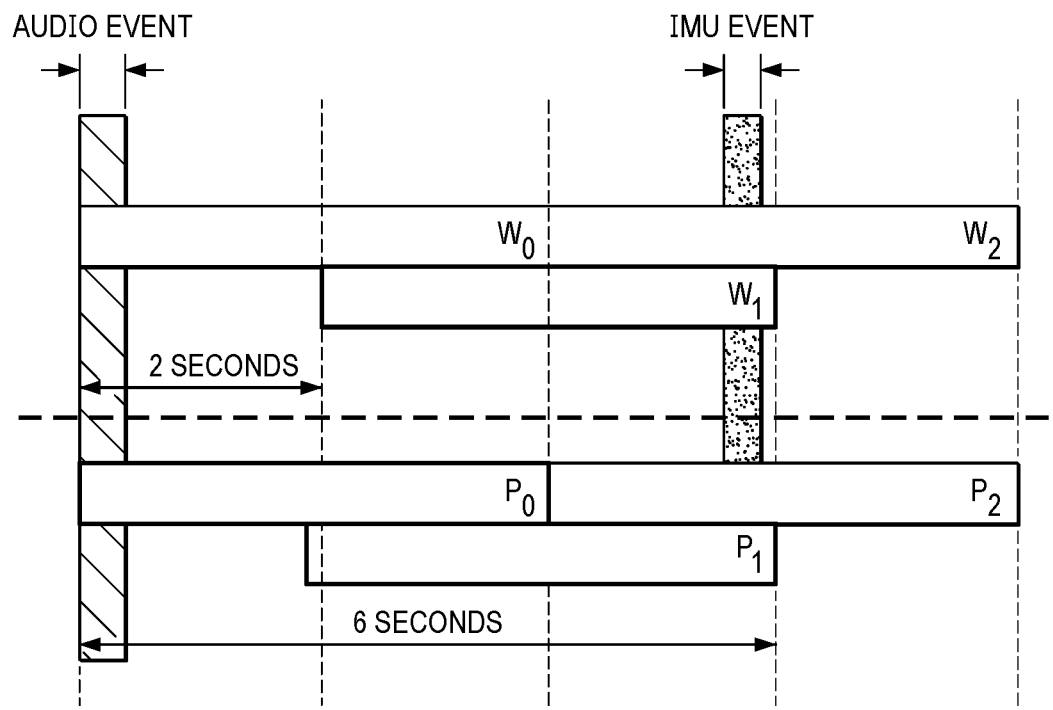

FIGS. 14A and 14B illustrate matching epochs across two devices, according to one or more embodiments. The upper portions of FIGS. 14A and 14B illustrate epochs $W_0$, $W_1$ and $W_2$ for a first crash device (e.g., a smartwatch), and the lower portions of FIGS. 14A and 14B illustrate epochs $P_0$, $P_1$ and $P_2$ for a second crash device (e.g., a smartphone).

To handle misalignments between epoch boundaries, a zone of retained epochs is defined as:

$$t(W_i) - 2 \le t(P_j) < t(W_i) + 2, \quad [2]$$

where the "2" values from left to right in Equation [2] are hereinafter referred to as lookBackTime and lookForwardTime, respectively, and are derived in accordance with FIGS. 13A-13C. The epochs that fall within the zone of retained epochs have a greater than or equal to 50% overlap. The zone of retained epochs extends the false positive range to +/−6 seconds, as shown in FIG. 14B. In some embodiments, lookForwardTime is achieved by introducing a delay using a buffer (delauBufferSize) on the first device for data processing, allowing remote audio data time to arrive.

Figure 15:
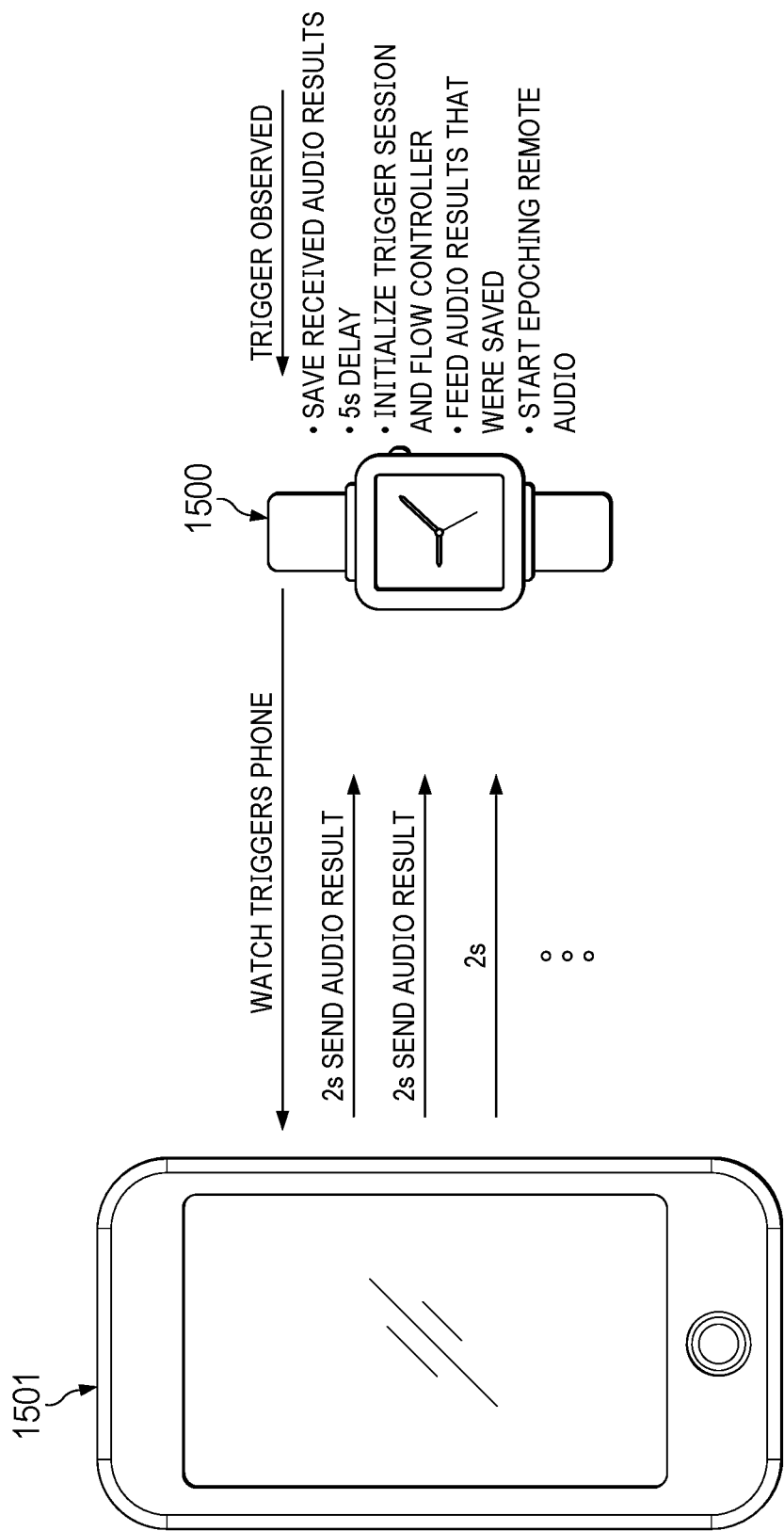
FIG. 15 illustrates a detection service on the crash device, according to one or more embodiments.

FIG. 15 illustrates a detection service (e.g., detection service 305 in FIG. 3), according to one or more embodiments. In some embodiments, the detection service can delay execution on a first device 1500 (e.g., a smartwatch) to allow the second device 1501 (e.g., a smartphone) time to send audio results. Sensor data is buffered and processing is delayed by N seconds (e.g., N=5). The flow controller and processing are deleted when idle and received audio frames are saved and applied on the next trigger event. The audio frames are stored and processed within a temporal window [lookBackTime, +lookForwardTime].

Referring again to FIG. 15, first device 1500 (e.g., a smartwatch) observes a crash trigger event and triggers second device 1501 (e.g., a smartphone 1501). In response, second device 1501 sends an audio result every N seconds to first device 1500, which is buffered by first device 1501. First device 1501 delays processing by N seconds (N=5), then initializes a trigger session and a flow controller 1101. Flow controller 1101 feeds audio results that were buffered and starts epoching the audio received from second device 1501.

Figure 16:
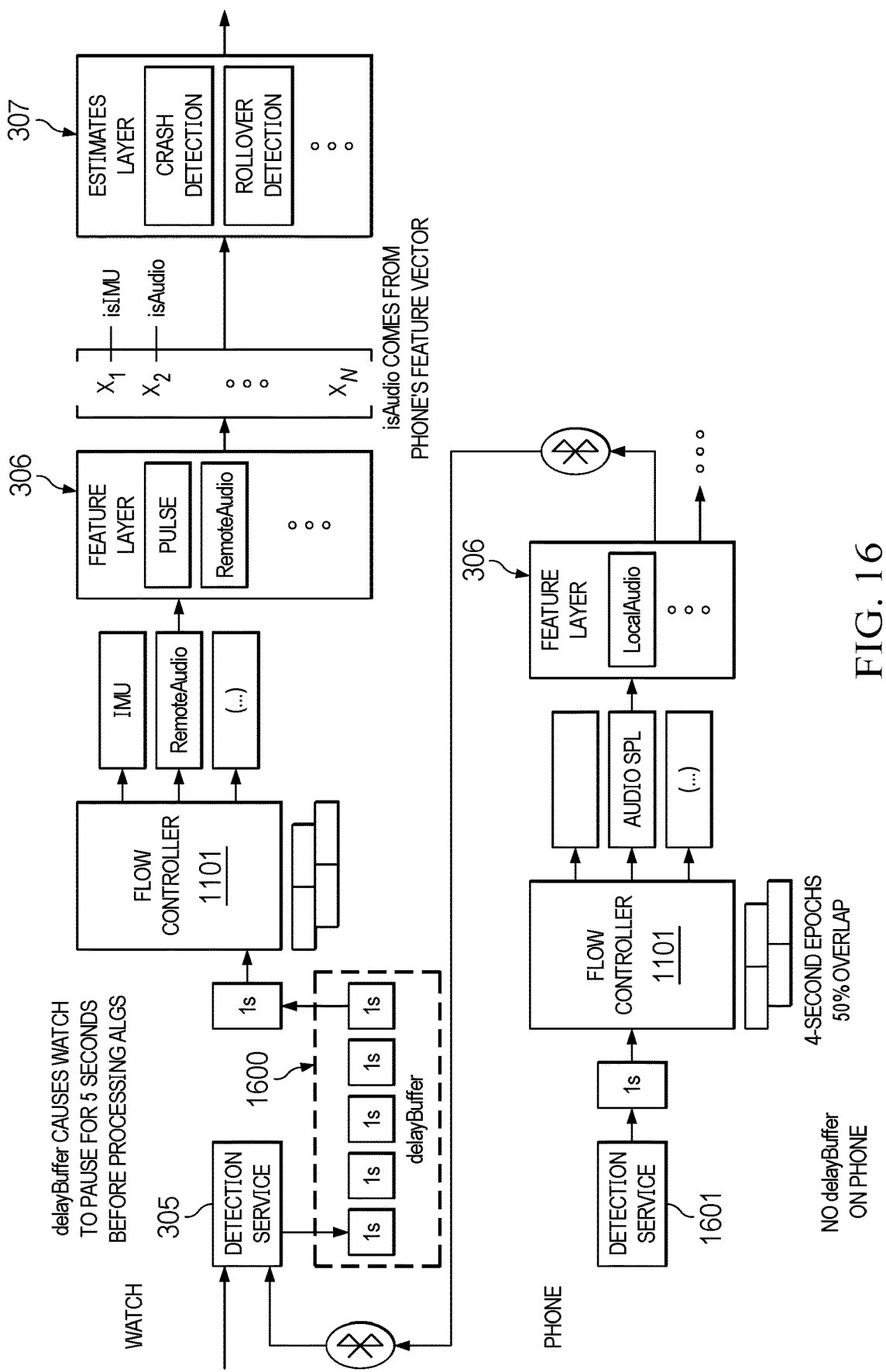
FIG. 16 illustrates a delay buffer that causes the crash device to pause for a predetermined time period before processing, according to one or more embodiments.

FIG. 16 illustrates a delay buffer 1600 that causes the crash device to pause for a predetermined time period before processing, according to one or more embodiments. The upper portion of FIG. 16 is the process flow on the first device 1500 (e.g., smartwatch), and the lower portion of FIG. 16 is the process flow on second device 1501 (e.g., smartphone). On second device 1501, detection service 1601 starts flow controller 1101 which processes 4-second epochs with 50% overlap which are input to feature layer 306. The features are wirelessly sent to first device 1500 where they are stored in delayBuffer 1600 for 5 seconds before being processed by flow controller 1101 and input into feature layer 306. The output of feature layer 306 includes multi-modal features received from second device 1501 (e.g., isAudio), which is combined into a single feature vector with other features (e.g., isIMU) generated on first device 1500. The feature vector is then input into estimates layer 307, which generates crash decisions, as previously described in reference to FIG. 3.

Figure 17:
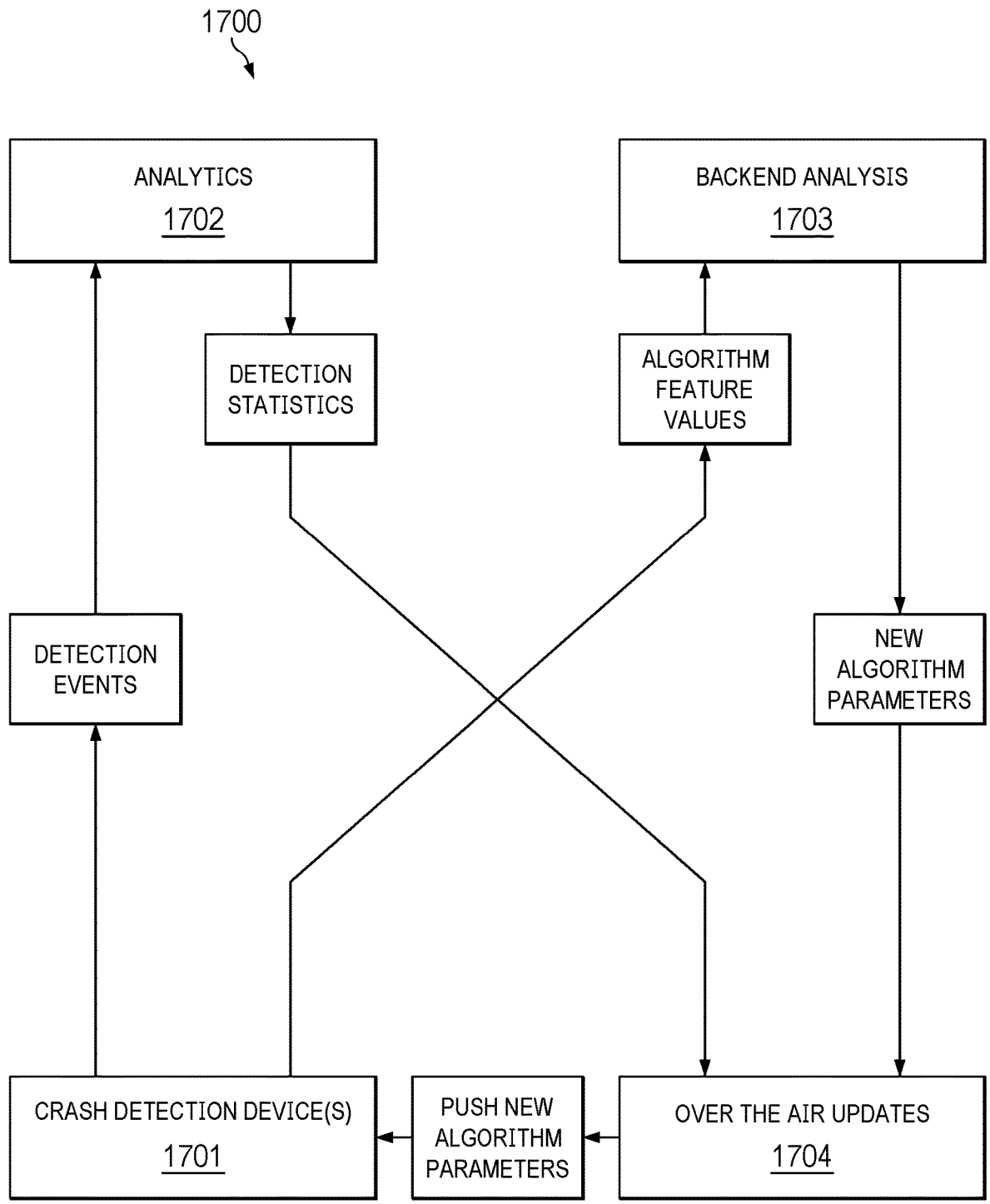
FIG. 17 illustrates a distributed and closed-loop system to actively modify crash detection behavior, according to one or more embodiments.

FIG. 17 illustrates a distributed and closed-loop system 1700 to actively modify crash detection behavior, according to one or more embodiments. System 1700 is a distributed, closed-loop crash detection system that allows a dynamic change in behavior based on field statistics. In some embodiments, system 1700 includes crash detection devices 1701 (e.g., smartwatches, smartphones), which send detection events to analytics processor 1702 operating on one or more network server computers. Crash detection devices 1701 also sends algorithm feature values to backend analysis processor 1703 operating on the one or more network service computers. Analytics processor 1702 generates detection statistics which are sent to over the air (OTA) update processor 1704, which pushes new algorithm parameters to crash detection devices 1701, as described more fully in reference to FIG. 18.

Figure 18A:
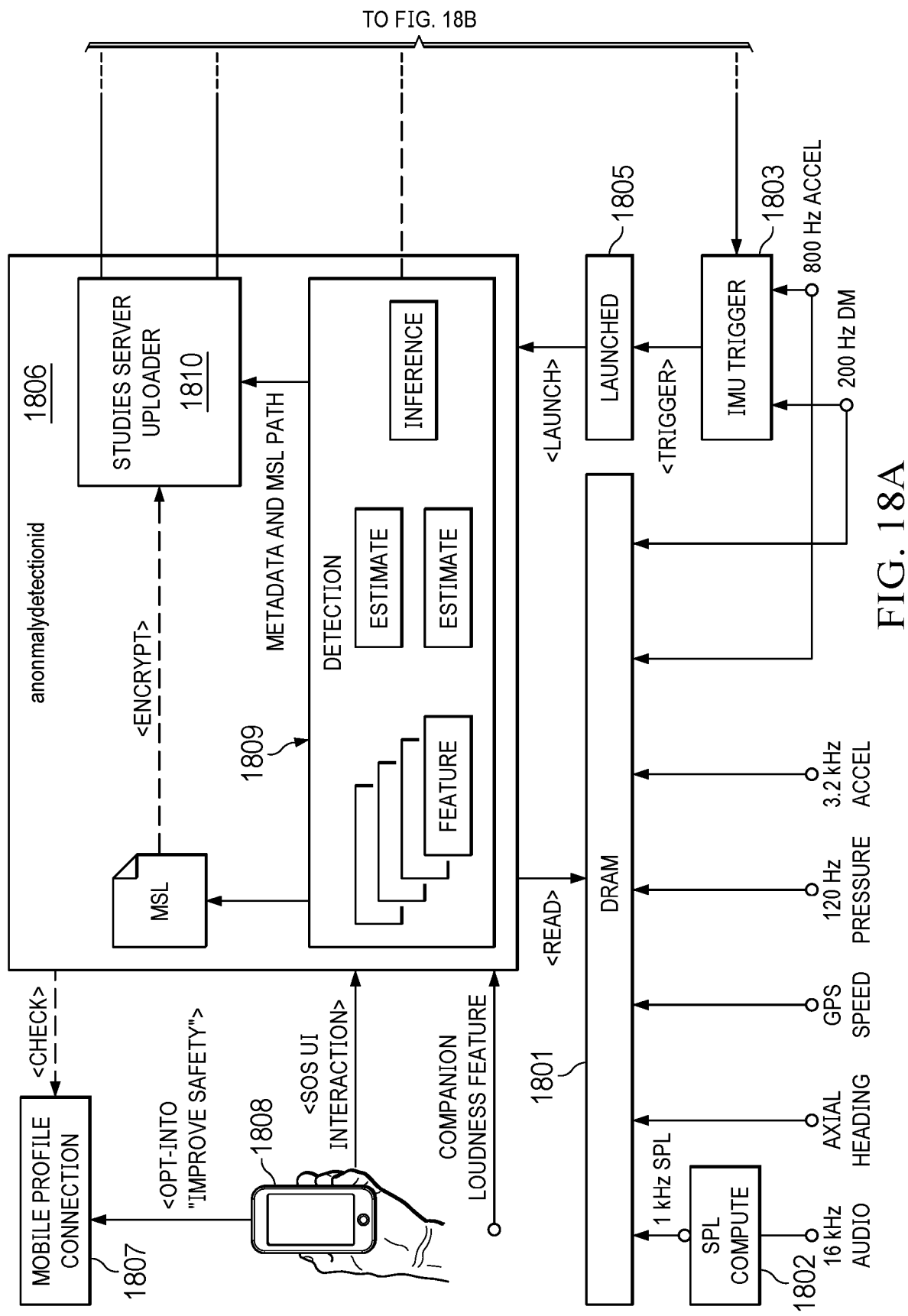
FIGS. 18A and 18B illustrate an architecture for crowd-source data collection and processing, according to one or more embodiments.
Figure 18B:
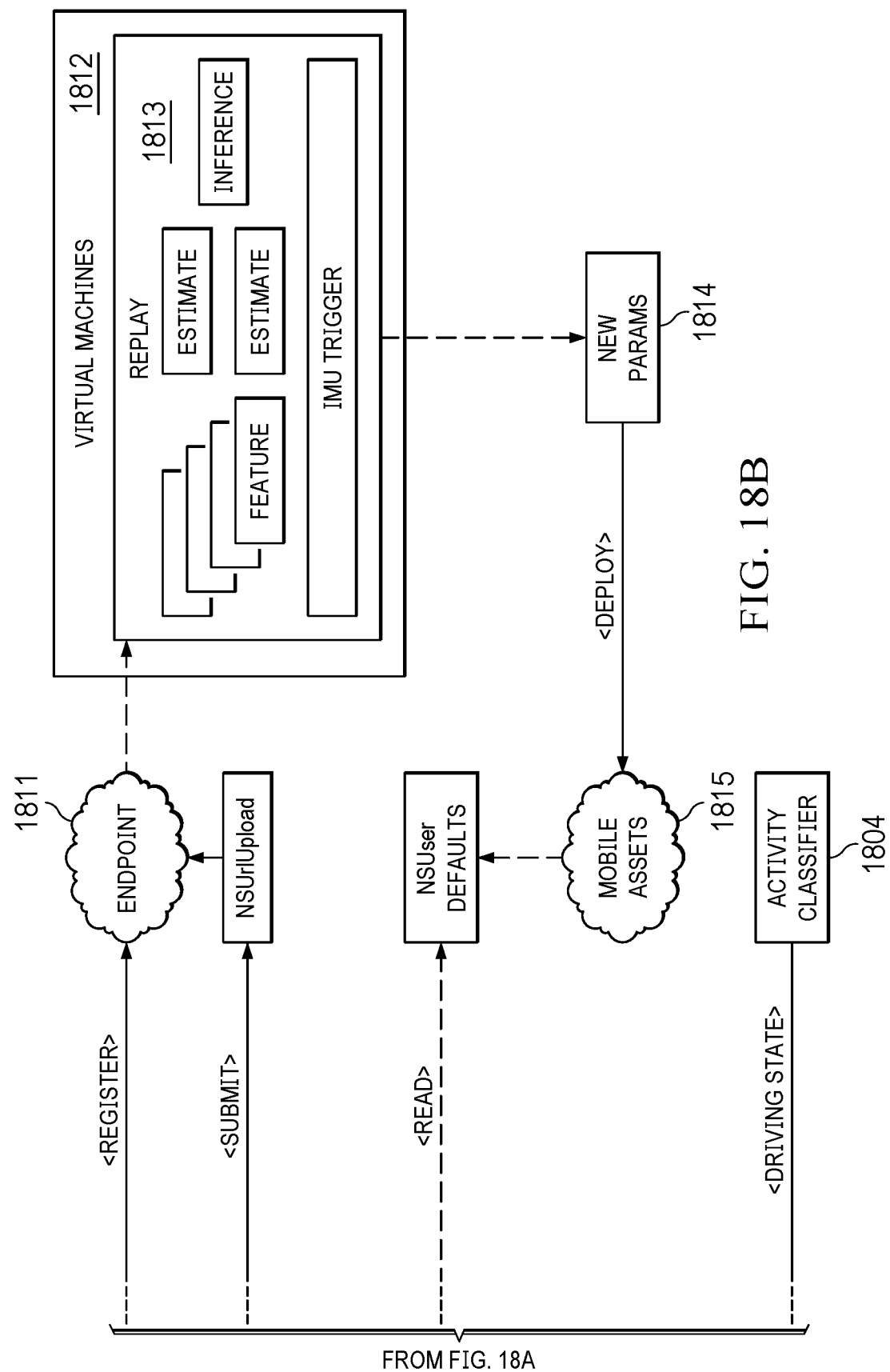

FIGS. 18A and 18B illustrate a software architecture 1800 for large scale data collection and processing, according to one or more embodiments. More particularly, system 1800 generates new algorithm parameters for crash detection algorithms running on crash devices in the field.

Sensor streams (e.g., audio, axial heading, GPS speed, pressure, acceleration, device motion, etc.) are captured/sampled and stored in memory 1801 of crash device(s). In some embodiments, the audio data is converted into SPL-by-SPL compute 1802 on the crash devices and the SPL is stored in memory 1801. IMU trigger 1803 generates crash trigger events based on device motion data. In some embodiments, IMU trigger 1803 also receives driving state data from activity classifier 1804, which is running on the crash devices. The driving state data indicates, e.g., based on a classifier applied to various sensor data (e.g., acceleration), that the crash device (and therefore the user) is currently riding in a vehicle. In some embodiments, if the driving state data indicates that the crash device is not in a vehicle, the trigger will not occur. If IMU trigger 1803 detects a crash event trigger, a launch daemon 1805 launches anomaly detection daemon 1806.

Anomaly detection daemon 1806 continuously runs on the crash devices in the field monitoring for crash trigger events. In some embodiments, a check is made of the users' mobile profile 1807 to determine if the users have opted-in to sharing crash data through their crash device 1808. If the users have opted-in, daemon 1806 collects crash data 1809 (e.g., features, estimates, inference, SOS UI escalations) and sends crash data 1809 to uploader 1810 which submits crash data 1809 to secure data processor endpoint 1811 (e.g., implemented on network server computers). Secure data processor endpoint 1811 is a large-scale data processing architecture that hosts a plurality of virtual machines 1813 for simulating crash data collected from crash devices. For example, virtual machines 1813 simulate (also referred to as "replay") crash events using the crash data to determine if new algorithm parameters (e.g., thresholds, weights, coefficients, etc.) need to be generated for the installed base of crash devices in the field. The new parameters are downloaded to the crash devices through mobile assets endpoint/server 1815. The parameters are updated with the new algorithm parameters.

Figure 19:
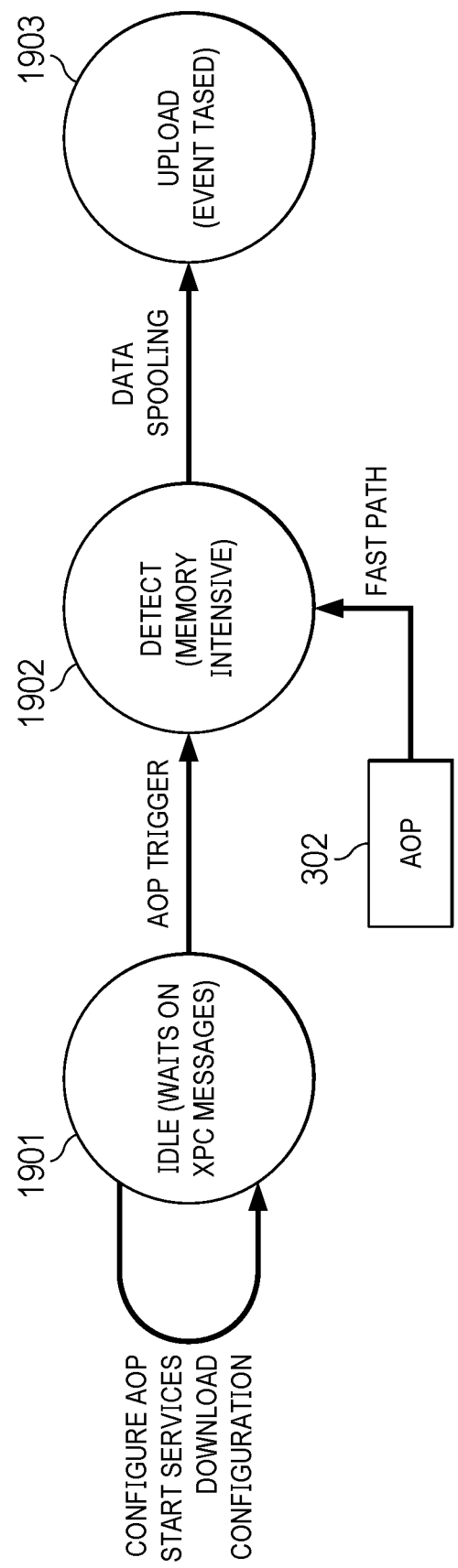
FIG. 19 is a state machine diagram illustrating anomaly detection operations, according to one or more embodiments.

FIG. 19 is a state machine diagram illustrating uploading crash data to secure data processor endpoint 1811, according to one or more embodiments. The goal of daemon 1806 is to upload crash data to secure data processor endpoint 1811 so that the data can be run by memory/CPU intensive algorithms in parallel to classify a batch of sensor data into crash detection and non-crash detection events, as described more fully in reference to FIG. 20.

In some embodiments, the states of daemon 1806 are classified into three types: Idle 1901, detect 1902 and upload 1903. When a crash device is turned on, application processor 302 is configured to start a service to download a configuration for the crash device from mobile assets endpoint 1815 (See FIG. 18). IDLE daemon 1901 waits for messages (e.g., interprocess communication messages) from low-power processor 301. Responsive to the messages (trigger message), application processor 302 issues a trigger event which starts detection service 305 (FIG. 3). The crash data is spooled by detection service 305 for uploading to secure data processor endpoint 1812. Upload daemon 1806 uploads the crash data to secure data processor endpoint 1811.

Figure 20:
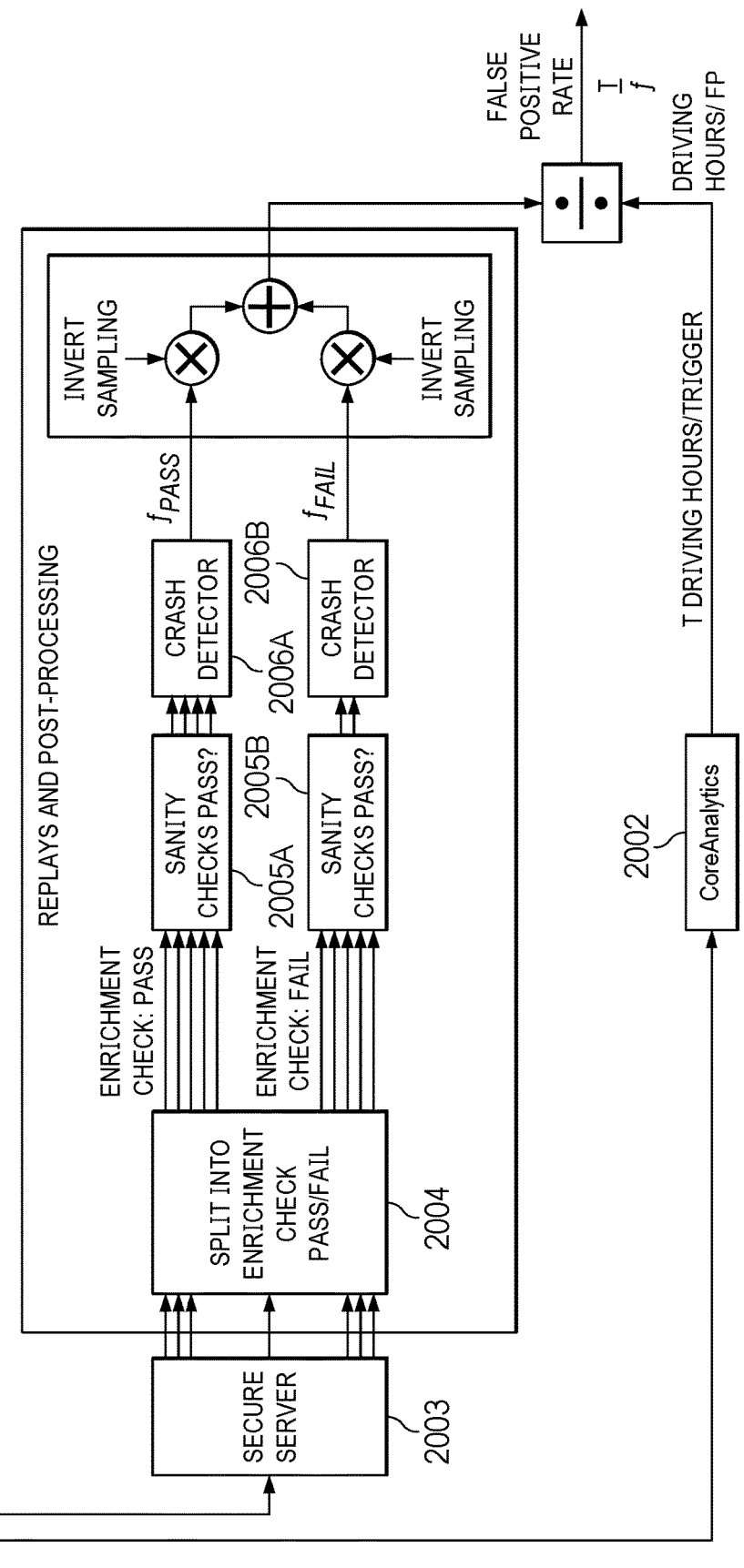
FIG. 20 is a block diagram of a backend large scale data analysis system, according to one or more embodiments.

FIG. 20 is a block diagram of a backend data analysis system 2000, according to one or more embodiments. System 2000 is configured to identify a false positive escalation rate, which is used to determine if crash detection algorithm improvement is needed. Starting from the left of FIG. 20, a crash trigger event generated by low-power processor 301 (FIG. 3) is processed by enrichment check 2001 to determine a probability of whether a particular crash event trigger was a in fact a crash (pass) or a non-crash (fail). The trigger is also sent to Analytics Server 2002. The output of enrichment check 2001 is sent to secure server 2003. Secure server 2003 splits 2004 the data output by enrichment check 2001 into separate pass/fail processing paths. The crash data is processed by sanity checks 2005a, 2005b in the processing paths, and if the data passes sanity checks 2005a, 2005b, the crash data is input into crash detectors 2006a, 2006b, which simulate or "replay" the crash events using the crash data for pass ($f_{pass}$) and fail ($f_{fail}$).

The outputs of crash detectors 2006a, 2006b, respectively, are input into invert sampler 2007. Inverse sampler 2007 samples the crash data until a pre-specified number of crash trigger events is observed. In some embodiments, the number of crash trigger events observed is predetermined and the sample size is a random variable that follows a negative binomial distribution.

The output of invert sample 2007 (f) is divided by driving hours per trigger T, which is computed by Analytics processor 2002, which gives the false positive rate T/f. The false positive rate can then be used to determine if the crash detection algorithms operating on the crash devices need to be improved with, for example, new tuning parameters.

Figure 21:
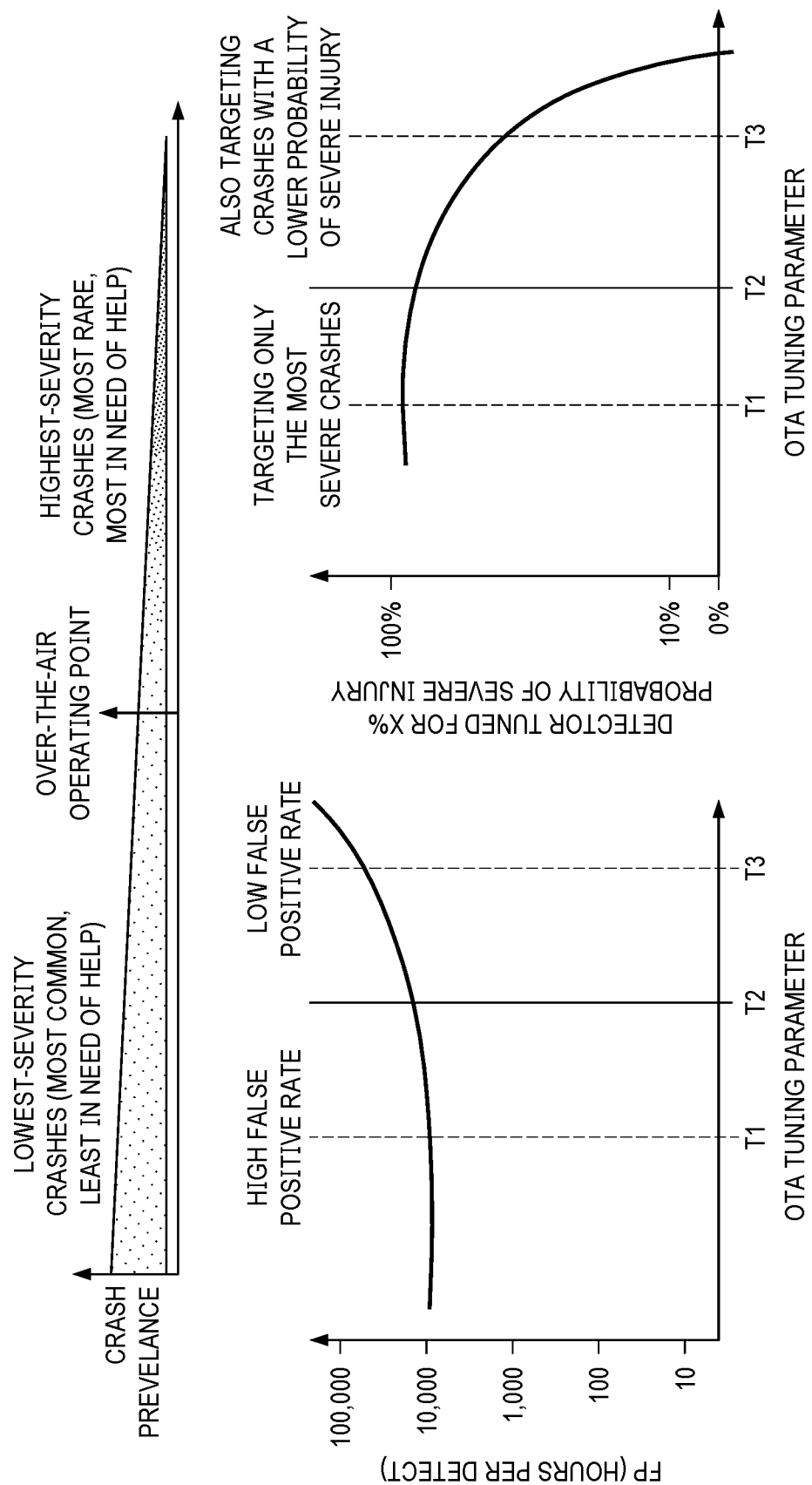
FIG. 21 illustrates a tunable in-system process, according to one or more embodiments.

FIG. 21 illustrates a tunable in-system algorithm, according to one or more embodiments. Because of the large amount of crowdsourced crash data, a tunable OTA operating point is used as shown in FIG. 21. The OTA frequency is tuned to strike a balance between lowest-severity crashes (most common and least need of help) and highest-severity crashes (most rare, most in need of help). FIG. 21 also shows a graph of FP (hours per detect) versus the OTA tuning parameter. FIG. 21 also shows a graph of probability of severe injury versus the OTA tuning parameter. Note that the OTA tuning parameter is chosen to target only the most severe crashes and crashes with a lower probability of sever injury.

Example Process

Figure 22:
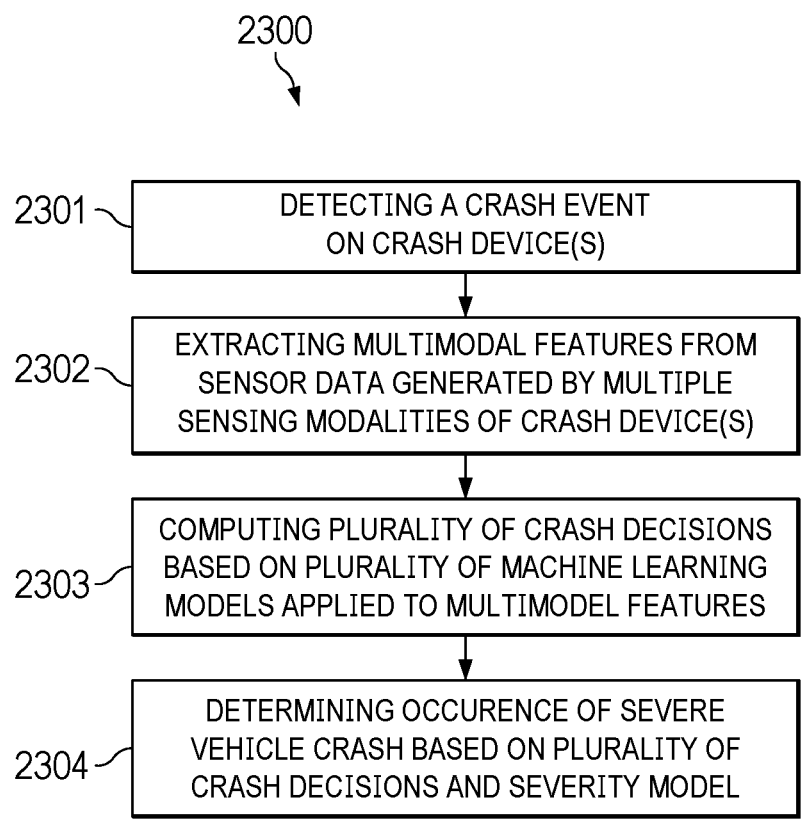
FIG. 22 is a flow diagram of a process for crash detection, as described in reference to FIGS. 1-21.

FIG. 22 is a flow diagram of a process 2200 for crash detection, as described in reference to FIGS. 1-21. Process 2200 includes the steps of: detecting a crash event on a crash device (2201); extracting multimodal features from sensor data generated by multiple sensing modalities of the crash device (2202); computing a plurality of crash decisions based on a plurality of machine learning models applied to the multimodal features (2203); and determining that a severe vehicle crash has occurred involving the crash device based on the plurality of crash decisions and a severity model (2204).

Each of these steps were previously described in detail in reference to FIGS. 1-21.

Example Device Architecture

Figure 23:
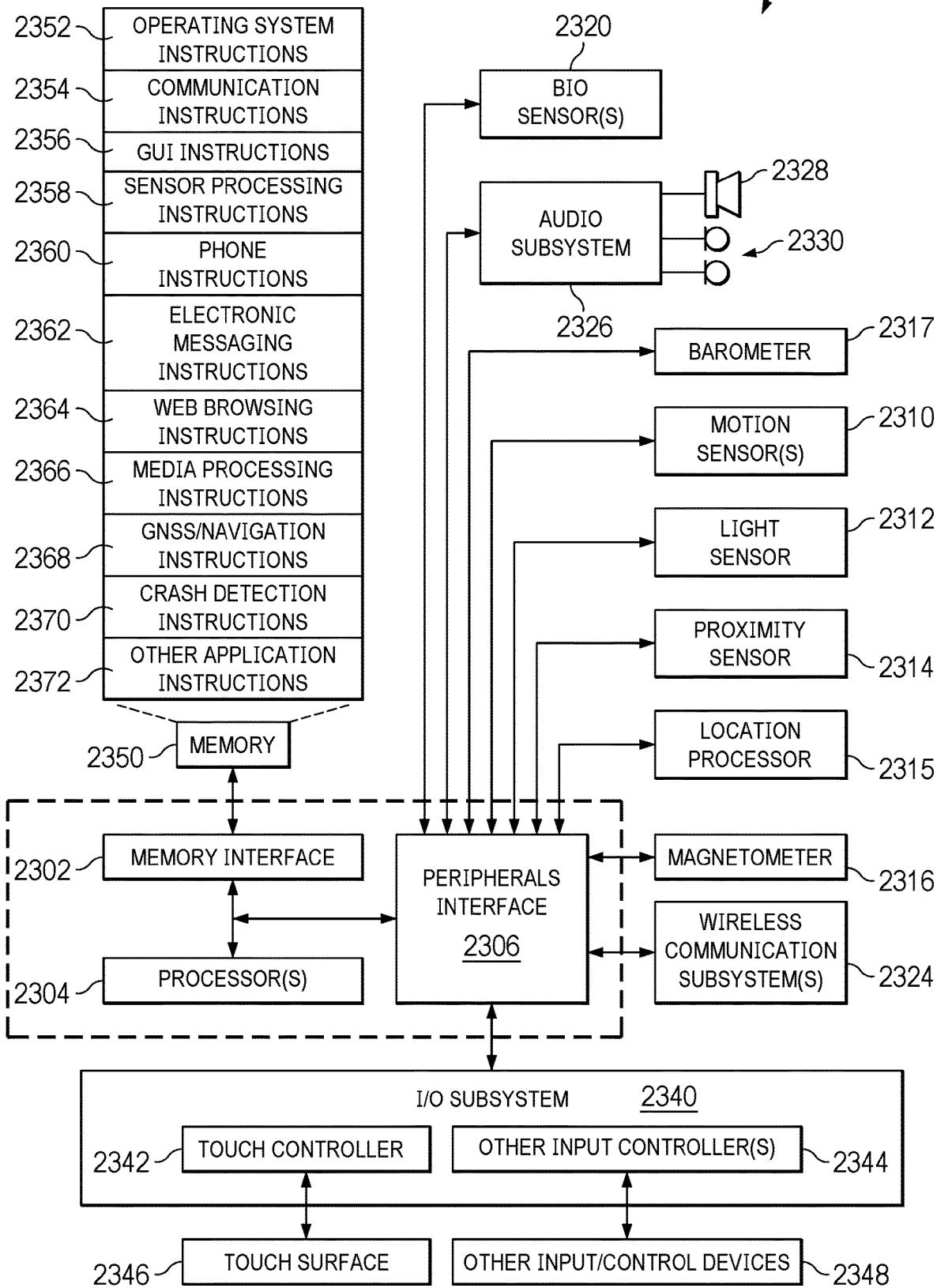
FIG. 23 is a block diagram of a device architecture for implementing the features and processes described in reference to FIGS. 1-22.

FIG. 23 is a block diagram of a crash device architecture 2300 for implementing the features and processes described in reference to FIGS. 1-22. Architecture 2300 can include memory interface 2302, one or more hardware data processors, image processors and/or processors 2304 and peripherals interface 2306. Memory interface 2302, one or more processors 2304 and/or peripherals interface 2306 can be separate components or can be integrated in one or more integrated circuits. System architecture 2300 can be included in any suitable electronic device for crash detection, including but not limited to: a smartwatch, smartphone, fitness band and any other device that can be attached, worn, or held by a user.

Sensors, devices, and subsystems can be coupled to peripherals interface 2306 to provide multiple functionalities. For example, one or more motion sensors 2310, light sensor 2312 and proximity sensor 2314 can be coupled to peripherals interface 2306 to facilitate motion sensing (e.g., acceleration, rotation rates), lighting and proximity functions of the wearable device. Location processor 2315 can be connected to peripherals interface 2306 to provide geo-positioning. In some implementations, location processor 2315 can be a GNSS receiver, such as the Global Positioning System (GPS) receiver. Electronic magnetometer 2316 (e.g., an integrated circuit chip) can also be connected to peripherals interface 2306 to provide data that can be used to determine the direction of magnetic North. Electronic magnetometer 2316 can provide data to an electronic compass application. Motion sensor(s) 2310 can include one or more accelerometers and/or gyros configured to determine change of speed and direction of movement. Barometer 2317 can be configured to measure atmospheric pressure (e.g., pressure change inside a vehicle). Bio signal sensor 2320 can be one or more of a PPG sensor, an electroencephalogram (EEG) sensor, an electrocardiogram (ECG) sensor, an electromyogram (EMG) sensor, a mechanomyogram (MMG) sensor (e.g., piezo resistive sensor) for measuring muscle activity/contractions, an electrooculography (EOG) sensor, a galvanic skin response (GSR) sensor, a magnetoencephalogram (MEG) sensor and/or other suitable sensor(s) configured to measure bio signals.

Communication functions can be facilitated through wireless communication subsystems 2324, which can include radio frequency (RF) receivers and transmitters (or transceivers) and/or optical (e.g., infrared) receivers and transmitters. The specific design and implementation of the communication subsystem 2324 can depend on the communication network(s) over which a mobile device is intended to operate. For example, architecture 2300 can include communication subsystems 2324 designed to operate over a GSM network, a GPRS network, an EDGE network, a WiFi™ network and a Bluetooth™ network. In particular, the wireless communication subsystems 2324 can include hosting protocols, such that the crash device can be configured as a base station for other wireless devices.

Audio subsystem 2326 can be coupled to a speaker 2328 and a microphone 30 to facilitate voice-enabled functions, such as voice recognition, voice replication, digital recording, and telephony functions. Audio subsystem 2326 can be configured to receive voice commands from the user. Audio subsystem 2326 can be used to capture audio during a crash and to convert the audio to SPL for crash detection processing.

I/O subsystem 2340 can include touch surface controller 2342 and/or other input controller(s) 2344. Touch surface controller 2342 can be coupled to a touch surface 2346. Touch surface 2346 and touch surface controller 2342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 2346. Touch surface 2346 can include, for example, a touch screen or the digital crown of a smart watch. I/O subsystem 2340 can include a haptic engine or device for providing haptic feedback (e.g., vibration) in response to commands from processor 2304. In an embodiment, touch surface 2346 can be a pressure-sensitive surface.

Other input controller(s) 2344 can be coupled to other input/control devices 2348, such as one or more buttons, rocker switches, thumbwheel, infrared port, and USB port. The one or more buttons (not shown) can include an up/down button for volume control of speaker 2328 and/or microphone 2330. Touch surface 2346 or other controllers 2344 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 2346; and a pressing of the button for a second duration that is longer than the first duration may turn power to the mobile device on or off. The user may be able to customize a functionality of one or more of the buttons. The touch surface 2346 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 2302 can be coupled to memory 2350. Memory 2350 can include high-speed random-access memory and/or non-volatile memory, such as one or more magnetic disk storage devices, one or more optical storage devices and/or flash memory (e.g., NAND, NOR). Memory 2350 can store operating system 2352, such as the iOS operating system developed by Apple Inc. of Cupertino, California. Operating system 2352 may include instructions for handling basic system services and for performing hardware dependent tasks. In some implementations, operating system 2352 can include a kernel (e.g., UNIX kernel).

Memory 2350 may also store communication instructions 2354 to facilitate communicating with one or more additional devices, one or more computers and/or one or more servers, such as, for example, instructions for implementing a software stack for wired or wireless communications with other devices. Memory 2350 may include graphical user interface instructions 2356 to facilitate graphic user interface processing; sensor processing instructions 2358 to facilitate sensor-related processing and functions; phone instructions 2360 to facilitate phone-related processes and functions; electronic messaging instructions 2362 to facilitate electronic-messaging related processes and functions; web browsing instructions 2364 to facilitate web browsing-related processes and functions; media processing instructions 2366 to facilitate media processing-related processes and functions; GNSS/Location instructions 2368 to facilitate generic GNSS and location-related processes and instructions; and crash detection instructions 2370 that implement the crash detection processes described in reference to FIGS. 1-22. Memory 2350 further includes other application instructions 2372 including but not limited to instructions for applications that utilize crash detection output.

Each of the above identified instructions and applications can correspond to a set of instructions for performing one or more functions described above. These instructions need not be implemented as separate software programs, procedures, or modules. Memory 2350 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    detecting, with at least one processor, a crash event on a crash device;
    extracting, with the at least one processor, multimodal features from sensor data generated by multiple sensing modalities of the crash device;
    computing, with the at least one processor, a plurality of crash decisions based on a plurality of machine learning models applied to the multimodal features; and
    determining, with the at least one processor, that a severe vehicle crash has occurred involving the crash device based on the plurality of crash decisions and a severity model;
    responsive to a severe crash being determined, presenting a notification on a screen of the crash device requesting a response from a user of the crash device;
    determining whether the crash device is stationary for a predetermined period of time;
    responsive to the crash device being stationary for the predetermined period of time,
        starting a timer or counter;
        determining that the timer or counter meets a threshold time or count, respectively; and
        escalating the notification.

2. The method of claim 1, further comprising:
    determining, as a result of the escalating, that no response to the notification was received after the threshold time or count was met, automatically contacting emergency services using one or more communication modalities of the crash device.

3. The method of claim 1, further comprising:
    sending, to a network server computer, at least one of the multimodal features, crash decisions, inference of a severe crash or user interactions with the notification;
    receiving, from the network server, at least one update to at least one parameter of at least one machine learning model or the severity model; and
    updating, with the at least one processor, the at least one parameter with the at least one update.

4. The method of claim 1, wherein at least one of the multimodal features is a deceleration pulse signature present in acceleration data.

5. The method of claim 1, wherein at least one of the multimodal features is sound pressure level of audio data captured by at least one microphone of the crash device.

6. The method of claim 1, wherein at least one of the multimodal features is a pressure change due to airbag deployment in the vehicle.

7. The method of claim 1, wherein at least one of the multimodal features is a drop in speed of the crash device.

8. The method of claim 1, further comprising:
receiving, with the at least one processor, crash-related features from a companion device coupled to the crash device;
computing, with the at least one processor, a plurality of crash decisions based on a plurality of machine learning models applied to the multimodal features and crash-related features; and
inferring, with the at least one processor, that a severe vehicle crash has occurred involving the crash device based on the plurality of crash decisions and a severity model.

9. The method of claim 6, further comprising:
matching epochs for the multimodal features with epochs for additional multimodal features to remove misalignment between epoch boundaries.

10. An apparatus comprising:
at least one motion sensor;
at least one processor;
memory storing instructions that when executed by the at least one processor, cause the at least one processor to perform operations comprising:
detecting a crash event based at least in part on sensor data from the at least one motion sensor;
extracting multimodal features from sensor data generated by multiple sensing modalities of the apparatus;
computing a plurality of crash decisions based on a plurality of machine learning models applied to the multimodal features; and
inferring that a severe vehicle crash has occurred involving the apparatus based on the plurality of crash decisions and a severity model;
responsive to a severe crash being determined, presenting a notification on a screen of the apparatus requesting a response from a user of the apparatus;
determining whether the apparatus is stationary for a predetermined period of time;
responsive to the apparatus being stationary for the predetermined period of time,
starting a timer or counter;
determining that the timer or counter meets a threshold time or count, respectively; and
escalating the notification.

11. The apparatus of claim 10, further comprising:
determining that no response to the notification was received from the user; and
automatically contacting emergency services using one or more communication modalities of the apparatus.

12. The apparatus of claim 10, wherein at least one of the multimodal features is a deceleration pulse signature present in acceleration data.

13. The apparatus of claim 10, wherein at least one of the multimodal features is sound pressure level of audio data captured by at least one microphone of the apparatus.

14. The apparatus of claim 10, wherein at least one of the multimodal features is a pressure change due to airbag deployment in the vehicle.

15. The apparatus of claim 10, wherein at least one of the multimodal features is a drop in speed of the apparatus.

16. The apparatus of claim 10, further comprising:
receiving crash-related features from a companion device coupled to the apparatus;
computing a plurality of crash decisions based on a plurality of machine learning models applied to the multimodal features and crash-related features; and
inferring that a severe vehicle crash has occurred involving the apparatus based on the plurality of crash decisions and a severity model.

17. The apparatus of claim 16, further comprising:
matching epochs for the multimodal features with epochs for additional multimodal features to remove misalignment between epoch boundaries.

18. The apparatus of claim 10, further comprising:
sending at least one of the multimodal features, crash decisions, inference of a severe crash or user interactions with the notification to a network server;
receiving at least one update to at least one parameter of at least one machine learning model or the severity model; and
updating the at least one parameter with the at least one update.

* * * * *